United States Patent
Studnitzer et al.

(10) Patent No.: US 8,781,948 B2
(45) Date of Patent: *Jul. 15, 2014

(54) TRADE MATCHING PLATFORM WITH VARIABLE PRICING BASED ON CLEARING RELATIONSHIPS

(75) Inventors: Ari Studnitzer, Northbrook, IL (US); Pearce Peck-Walden, Chicago, IL (US); James W. Farrell, Wheaton, IL (US); Paul J. Callaway, Chicago, IL (US); Barry L. Galster, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,234

(22) Filed: Aug. 1, 2012

(65) Prior Publication Data

US 2013/0198054 A1    Aug. 1, 2013

Related U.S. Application Data

(63) Continuation-in-part of application No. 13/437,583, filed on Apr. 2, 2012, which is a continuation-in-part of application No. 13/312,535, filed on Dec. 6, 2011, now Pat. No. 8,626,639.

(60) Provisional application No. 61/438,933, filed on Feb. 2, 2011.

(51) Int. Cl.
*G06Q 40/00* (2012.01)

(52) U.S. Cl.
USPC .......................................................... 705/37

(58) Field of Classification Search
CPC ........ G06Q 40/04; G06Q 40/06; G06Q 40/00

USPC ............................................ 705/37, 36 R, 35
See application file for complete search history.

(56) References Cited

U.S. PATENT DOCUMENTS

| | | | |
|---|---|---|---|
| 5,375,055 | A | 12/1994 | Togher et al. |
| 5,806,050 | A | 9/1998 | Shinn et al. |
| 6,014,627 | A | 1/2000 | Togher et al. |
| 6,985,883 | B1 | 1/2006 | Togher et al. |
| 6,996,541 | B2 | 2/2006 | Togher et al. |

(Continued)

FOREIGN PATENT DOCUMENTS

WO   WO 2007/061617   *   5/2007   ............. G06Q 40/00

OTHER PUBLICATIONS

CME Group: Implied Price Functionality Overview, 2007, pp. 1-12.*

(Continued)

*Primary Examiner* — Bijendra K Shrestha
(74) *Attorney, Agent, or Firm* — Banner & Witcoff, Ltd.

(57) ABSTRACT

The disclosure describes systems and methods for using enhanced RFQs and incoming enhanced orders to assist in detecting implied orders using an implied spread determination module. In one example, a system includes a processor and memory storing a search list and computer-executable instructions, where the instructions determine whether the financial instrument associated with an eRFQ or new enhanced order is on the search list, and then determine if an implied order exists in combination with that financial instrument and CCP attribute designations. In some embodiments, a timer may be used to track a predetermined amount of time to spend towards determining if implied orders exist for a particular financial instrument at particular clearing houses.

20 Claims, 7 Drawing Sheets

(56) References Cited

U.S. PATENT DOCUMENTS

| | | | |
|---|---|---|---|
| 7,003,488 | B2 | 2/2006 | Dunne et al. |
| 7,039,610 | B2 | 5/2006 | Morano et al. |
| 7,149,717 | B1* | 12/2006 | Kan .............................. 705/37 |
| 7,260,554 | B2 | 8/2007 | Morano et al. |
| 7,584,140 | B2 | 9/2009 | Brady et al. |
| 7,610,238 | B2 | 10/2009 | Togher et al. |
| 7,680,715 | B2* | 3/2010 | Waelbroeck et al. ........... 705/35 |
| 7,685,051 | B2 | 3/2010 | Cummings et al. |
| 8,165,952 | B2 | 4/2012 | Burrell et al. |
| 8,204,823 | B1 | 6/2012 | Morano et al. |
| 8,341,424 | B2 | 12/2012 | Erickson |
| 2003/0069830 | A1* | 4/2003 | Morano et al. .................. 705/37 |
| 2003/0177086 | A1* | 9/2003 | Gomber et al. ................. 705/37 |
| 2004/0236668 | A1 | 11/2004 | Toffey |
| 2005/0080703 | A1 | 4/2005 | Chiesa et al. |
| 2005/0119964 | A1 | 6/2005 | Brady et al. |
| 2005/0203826 | A1 | 9/2005 | Farrell et al. |
| 2006/0259411 | A1 | 11/2006 | Burns |
| 2007/0078749 | A1* | 4/2007 | Burns et al. ..................... 705/37 |
| 2007/0118459 | A1 | 5/2007 | Bauerschmidt et al. |
| 2008/0015970 | A1* | 1/2008 | Brookfield et al. ............. 705/37 |
| 2009/0055303 | A1 | 2/2009 | Callaway et al. |
| 2009/0089200 | A1 | 4/2009 | Stephen et al. |
| 2009/0171832 | A1* | 7/2009 | Busby ............................ 705/37 |
| 2010/0017321 | A1* | 1/2010 | Callaway et al. ............... 705/37 |
| 2010/0223201 | A1 | 9/2010 | Callaway et al. |
| 2011/0106686 | A1 | 5/2011 | Pechenik et al. |
| 2011/0145117 | A1 | 6/2011 | Fallon et al. |
| 2011/0166982 | A1 | 7/2011 | Cole et al. |
| 2011/0313905 | A1 | 12/2011 | Siddall et al. |

OTHER PUBLICATIONS

Chicago Board of Trade: How the e-cbot Market Works, 2003, pp. 1-29.*

U.S. Appl. No. 12/638,810, filed Dec. 15, 2009; Inventors: Kevin Fallon, Ketan Patel, Moody Hadi, Michael Koblas, Dipanker Bose, and Simon Evans.

U.S. Appl. No. 11/841,258, filed Aug. 20, 2007; Inventors: Paul J. Callaway, Michael E. Culhane II, Sunil K. Cutinho, Frank Kmiec, and Ari Studnitzer.

U.S. Appl. No. 12/778,532, filed May 12, 2010; Inventors: Paul J. Callaway, Michael E. Culhane II, Sunil K. Cutinho, Frank Kmiec, and Ari Studnitzer.

U.S. Appl. No. 12/186,383, filed Aug. 5, 2008; Inventors: Amy Stephen, Ari Studnitzer, Sunil Cutinho, Ed Gogol, Frank Kmiec, Paul J. Callaway, and Michael Culhane.

U.S. Appl. No. 12/817,610, filed Jun. 17, 2010; Inventors: Jacke Siddall, Davd Salvadori, Paul Bauerschmidt, Ken Silhavy, Ari Studnitzer, Paul Callaway, John Curran, and Martin Stroup.

Nasdaq Working Quietly to Curb Bank Control of Clearinghouses, Clea Benson, Robert Schmidt and Silla Brush, Dec. 20, 2010, http://www.bloomberg.com/news/print/2010-12-20/nasdaq-working-quietly-to-curb-bank-control, retrieved Jan. 25, 2011, 5 pages.

CME signs up Wall Street heavy hitters for swaps clearing, Chicago Business, Dec. 3, 2009, http://www.chicagobusiness.com/cgi-bin/printStory.pl?news_id=36328, retrieved Dec. 3, 2009, 1 page.

SEF101: Deconstructing the Swap Execution Facility, Kevin McPartland, Posted Jul. 26, 2010, Deriv Alert.og, http://www.derivalert.org/blog/bid/43966/SEF-101-Deconstructing-the-Swap-Execution Facility, retrieved Jan. 25, 2011, 5 pages.

Execution and Clearing Process for Derivatives, taken from MF 10-K filed Jun. 10, 2009, http://www.wikinvest.com/stock/MF_Global_Ltd._(MF)/Execution_Clearing_Process_Derivatives, retrieved Jan. 27, 2011, 6 pages.

Swap Clearinghouses and Markets, Skadden Commentary on the Dodd-Frank Act, Jul. 9, 2010, Jerrold E. Salzman, http://www.skadden.com/Index.cfm?contentID=51&itemID=2130, retrieved Jan. 25, 2011, 7 pages.

Update 1-ICE to register as swaps trading platform, CEO says, Aug. 4, 2010, http://www.reuters.com/assets/print?aid=CNN0425882520100804, retrieved Jan. 25, 2011, 1 page.

Clearing Broker, What Does Clearing Broker Mean? http://www.investopedia.com/terms/c/clearingbroker.asp, retrieved Jan. 27, 2011, 1 page.

Executing Broker, What Does Executing Broker Mean? http://www.investopedia.com/terms/e/executingbroker.asp, retrieved Jan. 27, 2011, 1 page.

The Nitty-Gritty of Executing a Trade by Investopedia Staff, http://www.investopedia.com/articles/03/012403.asp, retrieved Jan. 27, 2011, 3 pages.

Cleared OTC Credit Default Swaps Extending Security to OTC Markets Through Open Clearing PowerPoint presentation, CME Group, Oct. 2009, 22 pages.

SEC Proposes Rules for Security-Based Swap Execution Facilities, Feb. 1, 2011, http://www.sec.gov/news/press/2011/2011-35.htm, retrieved Feb. 3, 2011, 7 pages.

Swap Execution Facility: The New Term on Wall Street, Ben Protess, Dec. 17, 2010, Legal/Regulatory, 3 pages.

What is a Swap Execution Facility? Streetwise Professor, Jul. 1, 2010, http://streetwiseprofessor.com/?p=3964, retrieved Jan. 25, 2011, 7 pages.

The Role of a Swap Execution Facility (SEF), © 2011 Tradeweb Markets LLC, tradeweb.com/about/.../style=print, retrieved Jan. 20, 2011, 3 pages.

PCT International Search Report mailed Jun. 1, 2012, PCT/US 12/23659, 13 pages.

U.S. Appl. No. 12/638,810, filed Dec. 15, 2009; Inventors: Kevin Fallon, Ketan Patel, Moody Hadi, Michael Koblas, Dipanker Bose and Simon Evans.

U.S. Appl. No. 11/841,258, filed Aug. 20, 2007; Inventors: Paul H. Callaway, Michael E. Culhane II, Sunil K. Cutinho, Frank Kmiec, and Ari Studnitzer.

U.S. Appl. No. 12/778,532, filed May 12, 2010; Inventors: Paul H. Callaway, Michael E. Culhane II, Sunil K. Cutinho, Frank Kmiec, and Ari Studnitzer.

U.S. Appl. No. 12/186,383, filed Aug. 5, 2008; Inventors: Amy Stephen, Ari Studnizer, Sunil Cutinho, Ed Gogol, Frank Kmiec, Paul J. Callaway, and Michael Culhane.

U.S. Appl. No. 12/817,610, filed Jun. 17, 2010; Inventors: Jake Siddall, Dave Salvadori, Paul Bauerschmidt, Ken Silhavy, Ari Studnitzer, Paul Callaway, John Curran, and Martin Stroup.

U.S. Appl. No. 10/986,967, filed Nov. 12, 2004; Inventors: James W. Farrell and James R. Krause.

File History for U.S. Appl. No. 13/437,583, filed Apr. 2, 2012; Inventor: Ari Studnitzer.

File History for U.S. Appl. No. 13/312,535, filed Dec. 6, 2011; Inventor: Ari Studnitzer.

File History for U.S. Appl. No. 13/834,891, filed Mar. 15, 2013; Inventors: Ari Studnitzer, James W. Farrell, Paul J. Callaway, Barry L. Galster, and Pearce Peck-Walden.

* cited by examiner

TRADE MATCHING PLATFORM WITH VARIABLE PRICING BASED ON CLEARING RELATIONSHIPS

This application is a continuation-in-part of U.S. patent application Ser. No. 13/437,583, filed Apr. 2, 2012, which is a continuation-in-part of U.S. patent application Ser. No. 13/312,535, filed Dec. 6, 2011, which claims priority from U.S. Provisional Patent Application Ser. No. 61/438,933, filed Feb. 2, 2011, all of which are herein incorporated by reference in their entireties.

This application is related to U.S. patent application Ser. No. 12/817,610, filed Jun. 17, 2010, entitled "Generating Implied Orders Based on Electronic Requests for Quotes," which is herein incorporated by reference in its entirety and was previously incorporated by reference in a priority application to this filing.

This application is also related to U.S. patent application Ser. No. 12/176,130, filed Jul. 18, 2008, entitled "Adaptive Implied Spread Matching," which is herein incorporated by reference in its entirety and was previously incorporated by reference in a priority application to this filing.

BACKGROUND

In the financial industry, credit default swaps (CDSs), request for quotes (RFQs), spread orders, and implied orders are well known.

A credit default swap (CDS) is a swap contract in which the buyer of the CDS makes a series of payments to the seller and, in exchange, receives a payoff if a credit instrument (typically a bond or loan) goes into default (fails to pay). Less commonly, the credit event that triggers the payoff can be a company undergoing restructuring, bankruptcy, or even just having its credit rating downgraded. There are two competing theories usually advanced for the pricing of credit default swaps. The first, referred to as the 'probability model', takes the present value of a series of cash flows weighted by their probability of non-default. This method suggests that credit default swaps should trade at a considerably lower spread than corporate bonds. The second model, proposed by Darrell Duffie, but also by John Hull and White, uses a no-arbitrage approach. Various techniques for valuing credit default swaps and determining their settlement price are known in the industry.

In addition, traders (and others) may submit a request for quote (RFQ or electronic RFQ) to an exchange and/or a regulated trading platform. RFQs are similar to orders submitted to an exchange, however, RFQs differ from an order in that an RFQ is not binding and not actionable. RFQs are well known in the art and commonly used by traders, clearing houses, and/or exchanges to inquire as to the current market for a particular financial instrument. RFQs, however, are sometimes abused. For example, a trader may flood the market with RFQs in an attempt to ascertain other traders' positions on particular financial instruments without binding himself to an order. Those that respond to RFQs (e.g., market makers, other traders, etc.) may disregard the RFQs due to the enormous quantity of RFQs. Unfortunately, a non-abusive RFQ may be left unresponded to because of such behavior. Furthermore, in some scenarios, market makers, which although they are under a contractual obligation to respond to RFQs, may still be less than diligent in responding to RFQs, thus resulting in a negative perception of an exchange. In addition to RFQs, traders may initially request non-binding indicative quotes from market makers, such as described in FIG. 3A and other portions of U.S. Pat. No. 7,584,140, entitled "Method and System for Providing Option Spread Indicative Quotes," which is incorporated by reference in its entirety herein.

In addition, traders sometimes desire to trade multiple financial instruments in combination using what is often called a spread order. Each component of the combination is called a leg. Traders can define the combination (e.g., an exchange-defined combination) and submit orders for each leg or in some cases can submit a single order for multiple financial instruments to avoid leg risk. Such orders may be called a strategy order, a spread order, or a variety of other names. For example, a spread is an order for the price difference between two contracts with the objective of profiting from a change in the price relationship. The counterparty orders that are matched against the aforementioned combination orders may be individual, "outright" orders or may be part of other combination orders. In the case of spread orders, the matching system may imply the counter party order by using multiple orders to create the counter party order. Examples of spreads include crack, crush, straddle, strangle, butterfly, calendar, and pack spreads.

Appendix E of U.S. Provisional Patent Application Ser. No. 61/438,933 explains that a spread is an order for the price difference between two contracts. This results in the trader holding a long and a short position in two or more related futures or options on futures contracts, with the objective of profiting from a change in the price relationship. A butterfly spread is an order for two inter-delivery spreads in opposite directions with the center delivery month common to both spreads. A calendar spread, also called a intra-commodity spread, for futures is an order for the simultaneous purchase and sale of the same futures contract in different contract months. (i.e., buying a September CME S&P 500® futures contract and selling a December CME S&P 500 futures contract). A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

Appendix E of U.S. Provisional Patent Application Ser. No. 61/438,933 further explains that a straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. Also the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Appendix E of U.S. Provisional Patent Application Ser. No. 61/438,933 further explains that by linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. patent application Ser. No. 10/986,967, entitled "Implied Spread Trading System," which is incorporated herein by reference.

Appendix E of U.S. Provisional Patent Application Ser. No. 61/438,933 further explains that, for example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. Implied IN or implied OUT spreads may be created when an electronic match system simultaneously works synthetic spread orders in spread markets and synthetic orders in the individual leg markets without the risk to the trader/broker of being double filled or filled on one leg and not on the other leg.

Appendix E of U.S. Provisional Patent Application Ser. No. 61/438,933 further explains that large exchanges typically have order books for numerous spread products and legs of the spread products. However, the identification and processing of potential implied spreads inside electronic trade systems consumes valuable processing resources that could otherwise be used to process outright orders. In a typical central limit order book implementation, the system component for receiving electronic trades from users appears as a single processing thread with a single point of control. In such an implementation, there is a requirement that one order matches only another order, and does not result in two competing processes both matching different orders against a single order. Therefore, implementations have been limited in such trading systems.

In conclusion, implied orders can fill in gaps in the market and allow spread and outright traders to share liquidity in a product where there would otherwise have been little or no available bids and asks. Thus, the liquidity of a product may be enhanced by the use of implied orders. For example, by linking the spread and outright markets, implied spread trading increases market liquidity. Examples of implied spread trading include those disclosed in U.S. patent application Ser. No. 10/986,967, entitled "Implied Spread Trading System," which is incorporated herein by reference. Large exchanges typically have order books for numerous spread products and legs of the spread products. The identification and processing of potential implied spreads inside electronic trading systems consumes sometimes substantial processing resources. U.S. Pat. No. 7,584,140, entitled "Method and System for Providing Option Spread Indicative Quotes," which is incorporated by reference in its entirety herein, describes systems and methods for, among other things, minimizing communication bandwidth consumption among parties trading derivative products and other types of financial instruments.

Finally, the Commodity Futures Trading Commission ("Commission" or "CFTC") is proposing new rules, and guidance and acceptable practices to implement new statutory provisions enacted by Title VII of the Dodd-Frank Wall Street Reform and Consumer Protection Act. The proposed rules, guidance, and acceptable practices, which apply to the registration and operation of a new type of regulated entity named a swap execution facility (SEF), implement the new statutory framework that, among other things, adds a new Section 5h to the Commodity Exchange Act ("CEA") concerning the registration and operation of swap execution facilities, and new Section 2(h)(8) to the CEA concerning the listing, trading and execution of swaps on swap execution facilities.

BRIEF SUMMARY

The present disclosure overcomes limitations of the prior art by providing methods and systems that provide for, among other things, an enhanced financial instrument comprising at least a clearing house attribute or desired clearing outcome. In one example, a method is disclosed for receiving, from a computing device of a user, an order for an enhanced financial instrument which identifies first and second clearing houses.

Similar to Appendix E of U.S. Provisional Patent Application Ser. No. 61/438,933, aspects of this disclosure overcome at least some of the limitations in the prior art by providing systems and methods for using enhanced request for quotes (eRFQs) and new enhanced orders to assist in detecting implied orders. Systems and methods are disclosed for receiving an eRFQ using a request for quote processor module, and sending some information from the eRFQ for use by an implied spread determination module. Also disclosed are systems and methods for receiving a new enhanced order and sending some information from the new enhanced order for use by an implied spread determination module. In one example, a system includes a processor and memory storing a search list and computer-executable instructions, where the instructions determine whether the financial instrument associated with an eRFQ or new enhanced order is on the search list, and then determine if an implied order exists in combination with that financial instrument and CCP attribute designations associated with standing orders (e.g., spread orders, outright orders, etc.) In some embodiments, a timer may be used to track a predetermined amount of time to spend towards determining if implied orders exist for a particular financial instrument.

Of course, the methods and systems of the above-referenced embodiments may also include other additional elements, steps, computer-executable instructions or computer-readable data structures. In this regard, other embodiments are disclosed and claimed herein as well. For example, the computer system may comprise a computer processor and a tangible, non-transitory computer memory storing computer-executable instructions, which when executed by the processor, causes the computer system to perform one or more of the steps described herein. The details of these and other embodiments of the present disclosure are set forth in the accompanying drawings and the description below. Other features and advantages of the disclosure will be apparent from the description and drawings and from the claims.

BRIEF DESCRIPTION OF DRAWINGS

Embodiments of the disclosure may take physical form in certain parts and steps, embodiments of which will be described in detail in the following description and illustrated in the accompanying drawings that form a part hereof, wherein.

DETAILED DESCRIPTION

Figure 1:
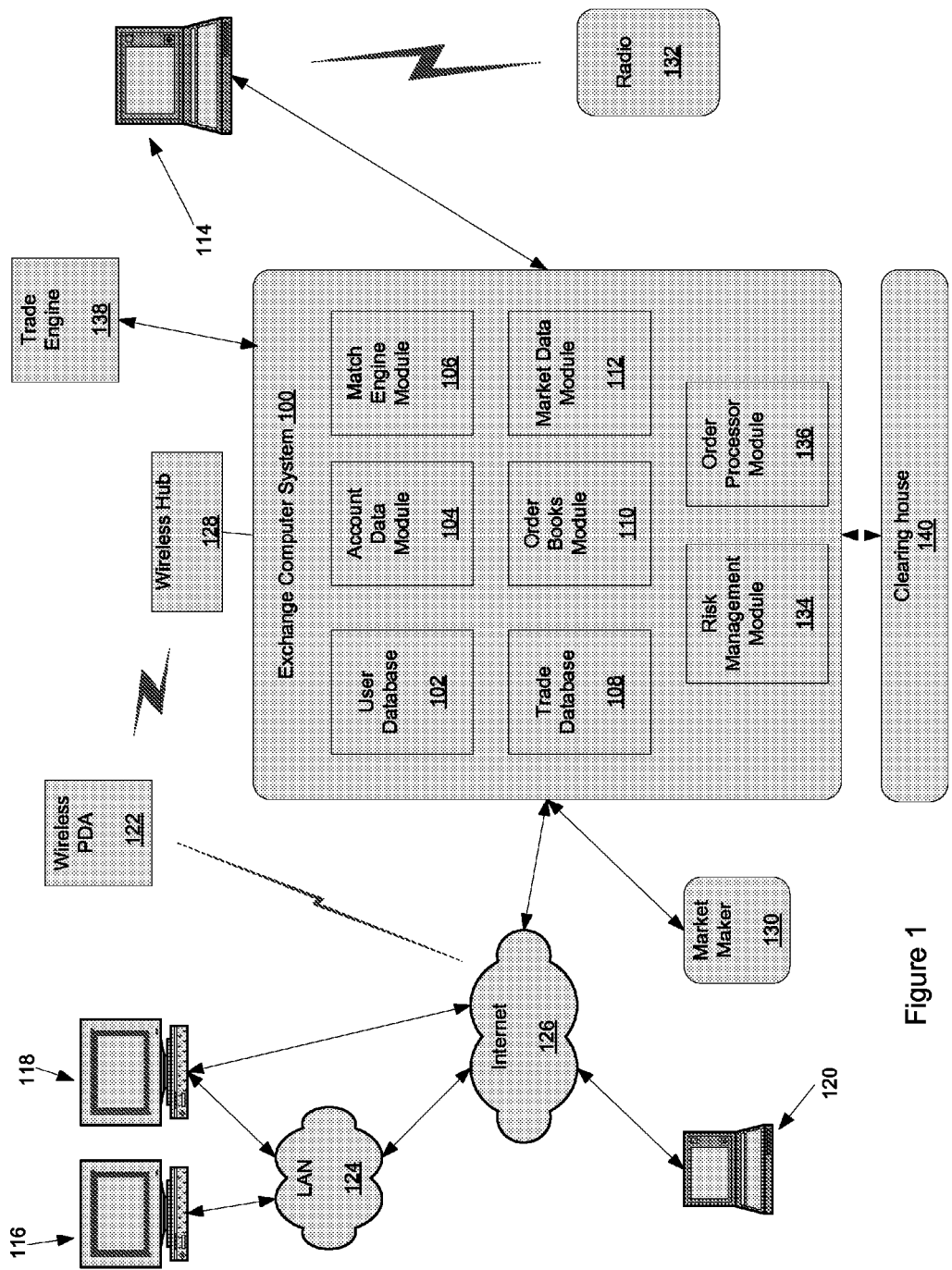
FIG. 1 depicts an illustrative computer network system that may be used to implement various aspects of the systems disclosed herein.

Similar to Appendix E of U.S. Provisional Patent Application Ser. No. 61/438,933, the present disclosure generally relates to systems and methods that are utilized in connection with the electronic trading of financial instruments. More particularly, implied spread financial transactions are generated using information from enhanced requests for quotes (eRFQs) and/or enhanced orders. The RFQ and order are enhanced, inter alia, because they include a CCP attribute, as described below. Implied order generation may be made more efficient by using an RFQ processor module to focus calculations performed by an implied spread determination module. A financial instrument associated with an eRFQ may be provided to the implied spread determination module to trigger the determination of whether implied orders may exist related to that particular financial instrument. In addition, in some embodiments, a financial instrument associated with a new enhanced order may be provided to the implied spread determination module to trigger the determination of whether implied orders exist related to that particular financial instrument.

In addition, the disclosure describes a regulated trading platform capable of communicating with a plurality of clearing houses. In particular, aspects of the disclosure relate to providing and/or calculating differentiated prices for the same or underlying financial product/instrument capable of being cleared at different clearing houses. The trading platform may allow anonymous counterparties in a multi-clearing house environment, and with full transparency and improved liquidity. The trading platform may also allow for non-anonymous counterparties in some situations.

Methods, systems and apparatuses are disclosed for an environment including, in some embodiments, a regulated trading platform (e.g., a SEF), which interacts with one or more clearing houses and users (e.g., buy-side clients, dealers (e.g., swap dealers), etc.), using enhanced financial instruments and enhanced graphical user interfaces (GUIs) or message interfaces. In some embodiments, dealers (or other entities or users providing liquidity) may calculate different prices for an enhanced financial instrument that is listed at multiple clearing houses (e.g., 140A, 140B, 140C, etc.) In some examples, the price may be driven by clearing house relationships (e.g., cross-margining benefits, different margin requirements, cost/price of clearing, etc.) In addition, the price may depend on factors such as, but not limited to, one or more of size of the order and the identity (e.g., credit rating) of the user (e.g., buy-side client). The regulated trading platform (e.g., a SEF) in such an example may aggregate and list trades to be cleared at multiple clearing houses, and have different prices for otherwise identical trades dependent on which clearing house a user can clear (or may wish to clear for margin and other reasons). A graphical user interface (GUI) in such an example may include a single display screen or multiple screens that display a matrix of clearing houses (e.g., clearing counter-party) to prices (see FIG. 3). For example, a clearing matrix may be displayed listing different clearing houses along the x-axis and different prices for the same financial instrument across the y-axis. Similarly, an automated trading system may, in some examples, maintain a memory map internally based on message interfaces to track prices as a function of clearing houses for a single financial product. A user may interact with the GUI (or alternatively, a scrolling text-based messaging interface such as a Bloomberg™ terminal) to select a desired price and/or clearing counter-party (CCP) to clear its financial instrument (e.g., over-the-counter (OTC) instrument, swaps trade, etc.)

A financial instrument traded/cleared in a system in accordance with the disclosure may include a standardized over-the-counter (OTC) agreement. The agreement may be standardized/harmonized through a set of specifications promulgated by an association (e.g., International Swaps & Derivatives Association) or entity (e.g., a clearing house, SEF, etc.) For example, the agreement (e.g., financial instrument) may include one or more of commonplace attributes/terms such as, but not limited to: price, notional amount, maturity/term, triggering event (e.g., in the case of a CDS), identification of a party/parties (e.g., a protection buyer) to the agreement. In one example, the price attribute may take the form of an array data structure. In addition, the agreement may include an attribute (e.g., a "CCP attribute") to designate a desired clearing house or CCP. The CCP attribute of the financial instrument may be populated through selection by a user of a clearing house (or a CCP where a CCP is linked to a clearing house) on a GUI (or alternatively, on a messaging interface) at a workstation terminal (e.g., computing device 120). A CCP may clear for just one clearing house, or alternatively, may be a clearing party for multiple clearing houses.

In an alternate embodiment, the CCP attribute of a financial instrument (e.g., OTC agreement) might not designate (i.e., left empty) a clearing house, and as such the system may rely on a default setting previously provided by the user (e.g., default user settings) and/or other entity (e.g., default global system settings). In one example, a default global system setting may apply to the entire regulated trading platform and either override or concede to the corresponding user-specific setting, if it is populated with a value. The default setting may provide the capability to provide greater preference details such that certain types of financial instrument may be automatically routed through an exchange to particular clearing houses or systems (e.g., non-SEF system 212). For example, the settings may indicate that all IRS agreements be cleared/quoted (e.g., via an enhance RFQ) using clearing house D (104D), while CDS agreements be cleared/quoted using clearing house C. The settings may indicate a list of unique identifiers corresponding to each of the clearing houses. In another embodiment, the indication may be a pointer linked to a group of clearing houses. For example, one illustrative group may be those clearing houses whose operating policy may prohibit sending bid/ask prices (or quote data responsive to enhanced RFQs) to users unless the user has an authorized relationship existing with the clearing house. The third indication of at least one clearing house restricted from the user may include the aforementioned illustrative group. In yet another example, a user may indicate that an order for a quantity of 100 contracts may be filled through any of two clearing houses (e.g., clearing house 140 A and 140B), and a trading platform system 100 may fill the orders and clear 60 contracts with clearing house 140A and the other 40 contracts with clearing house 140B. This indication (e.g., rule) may be stored in a user data store (e.g., user database 102) or other computer memory. Such aforementioned features may allow a trading platform (e.g., computing system 100) to offer users (e.g., user devices 120) and dealers (e.g., dealer devices 130) with a greater level of control over what information they receive and how that information is processed by the downstream systems (e.g., system 100 and clearing houses 140). Nevertheless, in some embodiments, the ability to submit an order (e.g., OTC agreement, incoming order, any inbound instructions, etc.) or trade may be governed by a clearing relationship and a user's desire/ability to clear at a specific CCP relative to the available prices at a CCP.

In accordance with various aspects of the disclosure, market data records about an enhanced financial instrument, in addition to comprising a financial identifier (e.g., "IBM" credit default swap), may also include a flag or identifier that indicates what clearing house (or other entity—e.g., DCM, non-SEF, SEF system) the market data relates to. For example, a "CCP attribute," as described herein, may be included in the market data record to indicate this relationship. Alternatively, this "CCP attribute" may indicate (e.g., with a blank value) that the market data record (e.g., a price quote on a particular instrument) is valid across all clearing houses. Such an embodiment may increase liquidity. In addition, the CCP attribute may enable linked orders wherein a user/dealer may be allowed to indicate that it wants a number (e.g., ten) of contracts of a particular financial instrument (e.g., IBM CDS) and that it wants them cleared through only two clearing houses. In such an example, some of the ten contracts may be cleared through clearing house A, while others are cleared through clearing house B. Moreover, in some examples the enhanced financial instrument may include a designation of different prices depending on the designated clearing house. The designation of different prices may be recited in the price attribute of the enhanced financial instrument. Alternatively, the price attribute may indicate an average price desired over all of the orders filled for the enhanced financial instrument. One or more combinations of the features recited above may be implemented and are contemplated by the disclosure. The user/dealer may also specify a priority setting (e.g., as part of the user settings) with a SEF 100 to indicate the preference in which orders may be cleared/executed and with whom they may be cleared (e.g., which clearing firm). Such linked orders may be enabled without requiring the user/dealer to create/manage separate contracts (e.g., one for clearing house A and another for clearing house B) because a standardized agreement may be used with the aforementioned CCP attribute. In other examples, a user/dealer may leave the CCP attribute blank to indicate that clearing house/firm is not a criteria for completing the order/request. As such, a SEF 100 may submit the order/request for clearing without regards for clearing house preferences.

Figure 3:
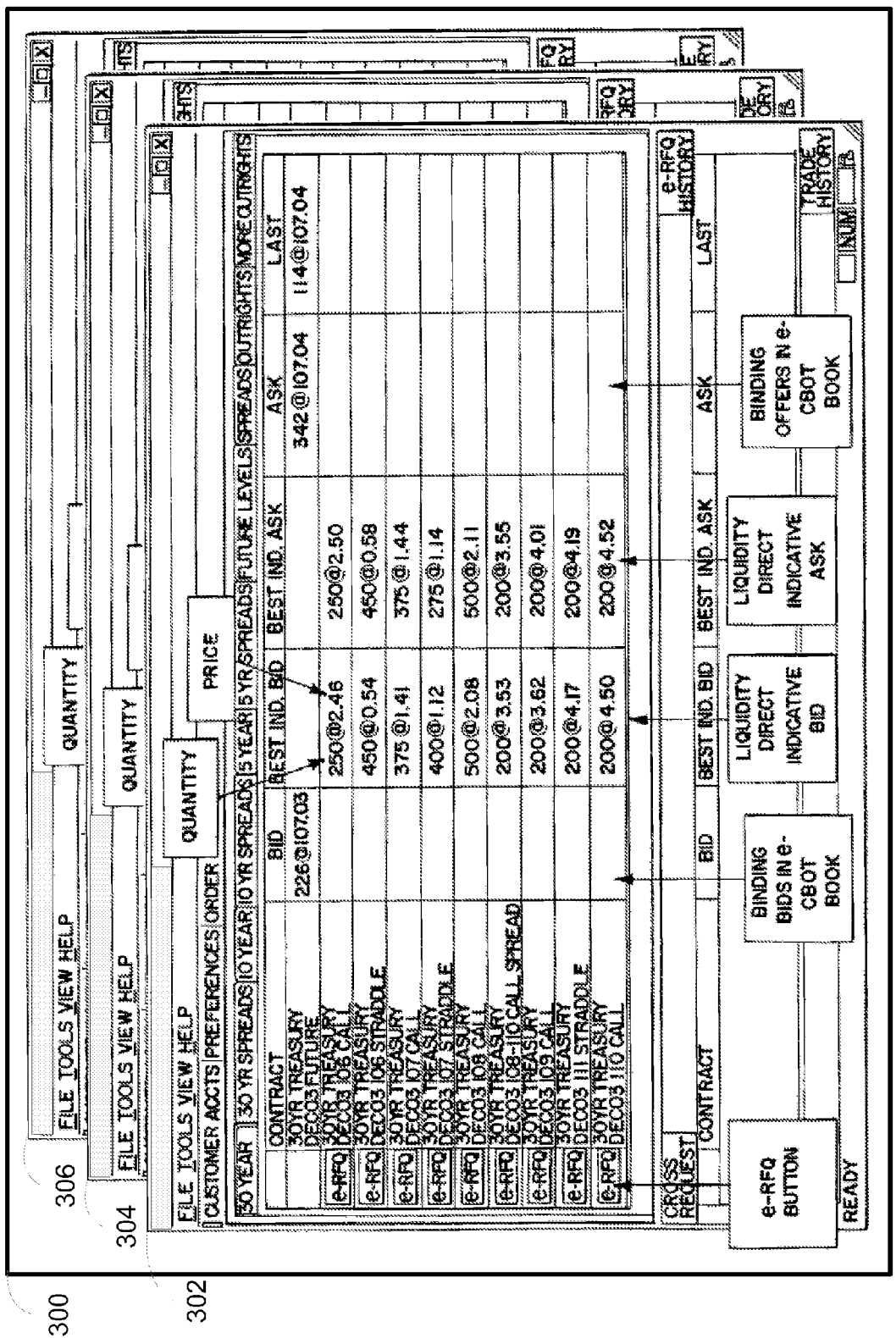
FIG. 3 shows an illustrative graphical user interfaces (GUIs) that may be generated and displayed in accordance with various aspects of the systems disclosed herein.

In accordance with the disclosure herein, a system is contemplated for generating and/or displaying a graphical user interface (GUI) comprising a matrix of price to clearing house (or other entities), as illustrated in FIG. 3. The system may comprise a processor, memory, and/or a display to execute computer-executable instructions recorded on the memory. The instructions may allow a user to select one or more financial instruments and to specify one or more clearing houses (or other entities—e.g., DCMs, etc.) The instructions may take this information and submit an enhanced RFQ, as described below, to a SEF, which sends a request to dealers for a quote with respect to particular clearing houses (or other entities). The SEF may collect and organize the information received from the dealers into a graphical user interface for display to a user of user computing system 120. The GUI, which may be displayed on a remote user computing system 120, may, as described herein, include values that are non-actionable (e.g., rendered as grayed out) for a particular user for various reasons, while other values are rendered as selectable/actionable. The decision whether a value is actionable/non-actionable may depend upon settings stored in a user data store 102, but the rendering of the values as actionable/non-actionable may occur at system 100 (e.g., server-side) or at user computing system 120 (e.g., client-side).

Figure 4:
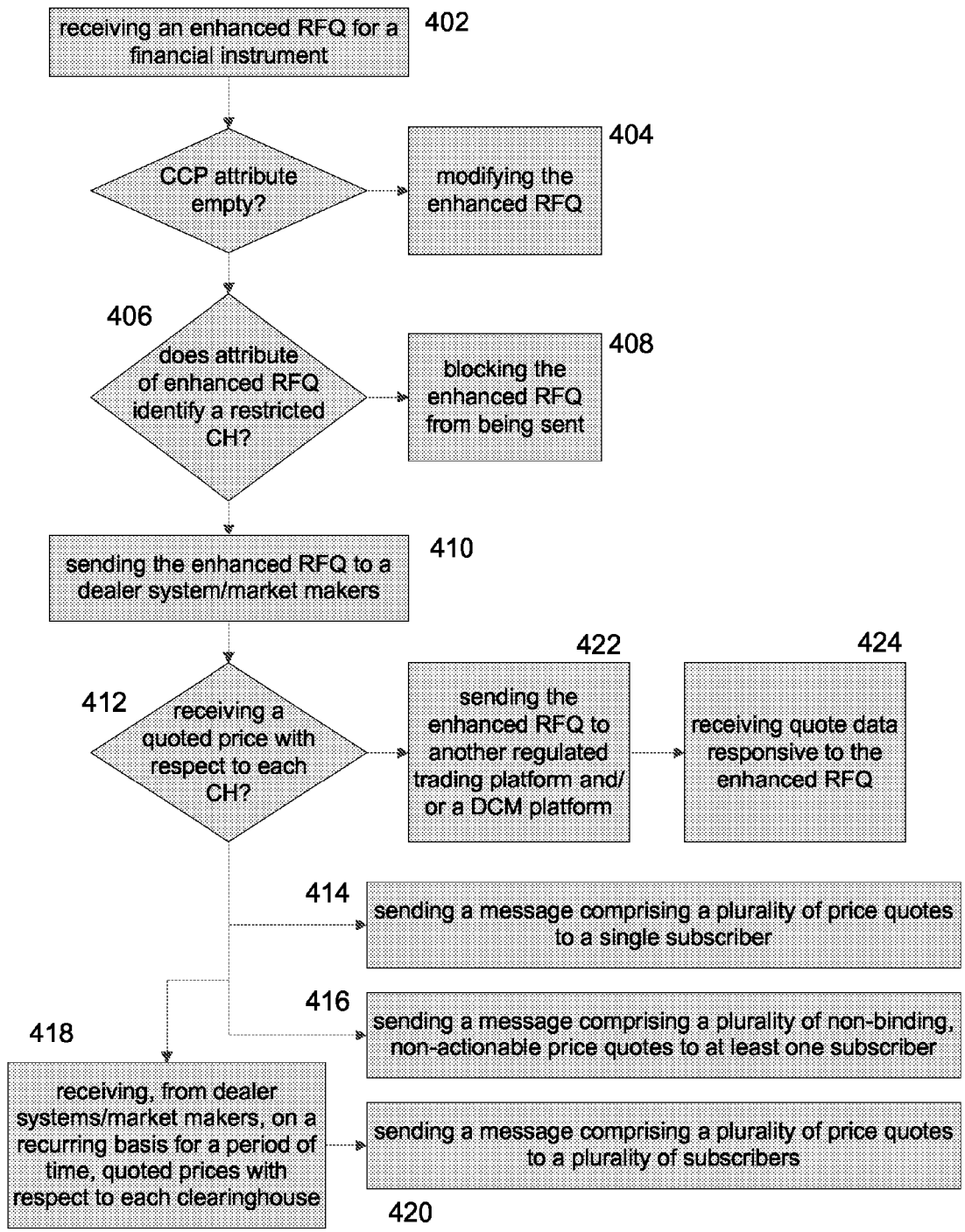
FIG. 4 is an illustrative flowchart of various steps that may be performed in accordance with various aspects of the systems involving request for quotes (RFQs)

In some examples, a user (e.g., user of computing device 120) may request an enhanced request-for-quote (RFQ) directed to one or more clearing houses (CHs). As a result, the user may be provided with a messaging interface or a GUI displaying a clearing house matrix (e.g., differentiated pricing based on desired CCP). Appendix E of U.S. Provisional Patent Application Ser. No. 61/438,933 provides aspects of a RFQ that may be included in accordance with various aspects of this disclosure. In particular, FIGS. 1 and 2 of Appendix E of U.S. Provisional Patent Application Ser. No. 61/438,933 illustrate a regulated trading system (e.g., system 100) that receives RFQs (see, e.g., FIG. 4, ref 402) from a user computing device 120 and processes the RFQs through a RFQ processor module 142 (as illustrated in Appendix E of U.S. Provisional Patent Application Ser. No. 61/438,933). Paragraph 0028 of Appendix E of U.S. Provisional Patent Application Ser. No. 61/438,933 explains numerous terms that may be included as part of the RFQ. The enhanced RFQ may include one, none, or more than one of the following terms: an indicator of whether the requested quote is buy-side or sell-side, statistics/information about the user/entity submitting the RFQ (e.g., excellent credit rating, premium status, etc.), covered or not covered, covered at a particular clearing house, amount of time before the RFQ expires (e.g., in the case of an open RFQ), a "spread best price" indicator (e.g., "best price" versus single clearing house price), and other terms.

In accordance with various embodiments of the systems disclosed herein, a clearing house (or non-SEF system 212) attribute/term (e.g., a "CCP attribute") may be included in the RFQ (i.e., enhanced RFQ 206) to designate one or more desired clearing houses to inquire about. For example, the RFQ 206 may designate only clearing house A (140A) and clearing house B (104B). As such, a computing system 100 receiving the RFQ may request market maker 130 to provide information only with respect to clearing at those particular clearing houses. One or more modules/components/system illustrated in FIGS. 1 and 2 of Appendix E of U.S. Provisional Patent Application Ser. No. 61/438,933 may be incorporated into the systems of FIGS. 1 and 2 of this disclosure to enable the features contemplated/disclosed herein.

In addition, in alternate embodiments, an enhanced RFQ might not designate a clearing house, and the clearing matrix generated for display to a user (e.g., a user of computing device 120) may display all clearing houses (or a subset of the clearing houses available for display to the user) by default. In some examples, the CCP attribute may be empty, or in the case of legacy RFQ messages (e.g., for backward compatibility reasons), the CCP attribute may be non-existent. In such cases, the system 100 may modify (see, e.g., FIG. 4, ref 404), using the request for quote processor module 142, the enhanced RFQ by adding the first clearing house and second clearing house to the attribute before sending the modified RFQ to one or more dealer system 130. In yet another embodiment, a user might submit an enhanced RFQ that does not designate a clearing house (or submit a RFQ that may be backwards compatible with the illustrated system 100), and may instead rely on a default setting previously provided by the user and/or other entity (e.g., default global system settings). In another example, the system 100 may modify (see, e.g., FIG. 4, ref 404), using the request for quote processor module 142, the enhanced RFQ by adding one or more clearing houses to the attribute in accordance with default settings (e.g., global and/or user-specific) before sending the modified RFQ to one or more dealer system 130. The default setting may provide the capability to provide greater preference details such that different clearing houses or systems (e.g., non-SEF system 212) may be designated for different types of financial instruments. These defaults may be used, in some examples, to support a market order that is sent for a financial instrument with a desire to obtain the best price following a default set of clearing houses up to a desired quantity. For example, the system settings may indicate that all IRS agreements be cleared/quoted using clearing house A, while CDS agreements be cleared/quoted using clearing house C. In another example, the RFQ 206 may be for a spread order for a futures contract that designates that the legs of the spread may be cleared across a set of clearing houses (e.g., 140A, 140D) instead of limiting the quote to a single clearing house. Other examples in accordance with various aspects of the disclosure include enhanced RFQs for an outright order for a futures contract and an outright order for an options contract. The aforementioned features may allow a trading platform (e.g., computing system 100) to provide benefits to it users/dealers, such as a better quoted price, and others as described herein.

In some examples, the ability to submit a RFQ for a particular product may be governed by a clearing relationship and/or a user's desire/ability to clear at a specific CCP relative to the available prices at a CCP. In addition, some clearing houses may have operating policies that may prohibit sending bid/ask prices (or quote data responsive to enhanced RFQs) to users unless the user has an authorized relationship existing with the clearing house. These restricted clearing houses may cause the system 100 to access, by a computer processor, a user data store to retrieve settings (see, e.g., FIG. 4, ref 406), and determine if the enhanced RFQ identifies a restricted clearing house. If it does, then the RFQ processor module 142 may block (see, e.g., FIG. 4, ref 408) the enhanced RFQ from being sent to the one or more dealer systems 130. Alternatively, the RFQ processor module 142 may modify the enhanced RFQ to remove those clearing houses that are restricted from the user, and then send (see, e.g., FIG. 4, ref 410) the modified enhanced RFQ to one or more dealer systems 130 (or a plurality of systems corresponding to market makers).

Market makers or dealers (e.g., a dealer of system 130) may choose to quote or not quote specific CCPs or quote different spreads and liquidity based on their desire to clear at a specific CCP. When dealer system 130 chooses to quote some or all CCPs designated in the enhanced RFP, the system 100 may receive (see, e.g., FIG. 4, ref 412) from the one or more dealer system, a quoted price of the financial instrument of the enhanced RFQ with respect to each (i.e., some or all) clearing house identified in the enhanced RFQ. However, in some instances, when a dealer/market maker chooses not to provide quotes with respect to some or all designated clearing houses, the system 100 may seek alternate options. In one example, the system 100 (e.g., RFQ processor module 142) may send (see, e.g., FIG. 4, ref 422) the enhanced RFQ to another regulated trading platform (e.g., SEF 200) configured for communication with the computer system 100. The other SEF 200 may include dealer systems 230 that might be willing to provide a quote in response to the RFQ. As a result, the system 100 may receive (see, e.g., FIG. 4, ref 424) from the other SEF 200 (or directly from the dealer system 230) quote data 220A responsive to the enhanced RFQ. In an alternate embodiment, the system 100 may choose to send the enhanced RFQ to one or both of SEF 200 and/or non-SEF system 212 (e.g., remote DCM platform) for responsive quotes.

In addition, in another embodiment in accordance with various aspects of the disclosure, the RFQ processor module 142 may be configured to wait a predetermined amount of time before submitting the enhanced RFQ 206 to another regulated trading platform (e.g., SEF 200) or non-SEF system (e.g., DCM 212), as discussed in described in Appendix E of U.S. Provisional Patent Application Ser. No. 61/438,933, which was previously incorporated by reference herein. For example, the RFQ processor module 142 may receive an RFQ 206 at time t1. A timer component in the RFQ processor module 142 may begin counting down from time t1 for a predetermined amount of time (e.g., 10 seconds, 30 seconds, 1 minute, 3 minutes, less than 5 minutes, etc.) until a response to the RFQ is received. If a response to the RFQ is received before the predetermined amount of time expires, then the RFQ response may be sent to the requesting entity/individual (e.g., a trader 120 requesting a quote on a particular financial instrument). If no response is received within the predetermined time, the enhanced RFQ may be submitted to another regulated trading platform (e.g., SEF 200) or non-SEF system (e.g., DCM 212). In some examples the RFQ processor module 142 may consult with a stored list of SEF and non-SEF system to determine which (if not all) of them to send the enhanced RFQ to. In another example, the enhanced RFQ may indicate (or the user settings for the trader 120 may indicate) which SEF and non-SEF systems to contact in the event that dealer system 130 associated with the system 100 is not responsive to the RFQ. In some examples the RFQ processor module 142 may submit the enhanced RFQ to another regulated trading platform (e.g., SEF 200) or non-SEF system (e.g., DCM 212) even if a response is received (e.g., from a market maker 130) within the predetermined amount of time. At least one benefit of such an approach is that more responsive quotes may be generated based on the single RFQ.

In accordance with various aspects of the disclosure, an enhanced RFQ 206 is contemplated that may also include a term/attribute for designating an external trading platforms (e.g., SEFs, DCMs, non-SEF systems, exchanges, etc.) Such an embodiment may enable users/traders to submit enhanced RFQs that may span numerous different SEF and non-SEF systems to provide greater liquidity and quote data. This disclosure also contemplates a method involving enhanced RFQs (with a clearing house attribute and other terms and one or more RFQ processor modules while omitting some or many of the modules/components described in Appendix E of U.S. Provisional Patent Application Ser. No. 61/438,933, such as the implied spread determination modules. In such a system, the submission of an enhanced RFQ may result in a clearing matrix (e.g., such as the price matrix illustrated in FIG. 3) being displayed on a GUI (or other messaging interface).

Referring to FIG. 3, the price matrix may provide the ability to view the different price quotes (e.g., bid and ask prices) for the same financial contract/agreement at multiple, different trading platforms (e.g., non-SEF system 212) or clearing houses (e.g., 104A, 104B, etc.) The received market data (or quote data 220A) may be used to populate the price matrix. The system 100 (e.g., RFQ processor module 142) may send a message (e.g., a single or multiple messages) to at least one subscriber, such as trader 120. The message may comprises a plurality of price quotes of the financial instrument with respect to different clearing houses (e.g., 140A, 140D) as requested by the enhanced RFQ, and may be organized in various different ways, including, but not limited to multiple levels deep and market by order. Depending on the type of enhanced RFQ (e.g., directed RFQ, open RFQ, Hybrid RFQ, etc.) submitted to the system 100, the message may be sent to one or more subscribers. For example, in the case of a directed RFQ, the message may be sent to a single subscriber 120 (see, e.g., FIG. 4, ref 414). A directed RFQ is commonly used in non-anonymous trading where a user 120 may be wish to designate with whom they wish to request a quote/trade. The quote data, which in one example is generated by the responding dealer system 130, may be customized for the user 120. In another example, in the case of an open RFQ, the message may be sent to some or all subscribers of the system 100 (see, e.g., FIG. 4, ref 420). An open RFQ is commonly used in anonymous trading where a user 120 may wish to request a quote without identifying the parties involved. In addition, open RFQs are commonly used for liquid product that are conducive to streaming. For example, an enhanced RFQ 206 may designate the amount of time that a user 120 wishes to receive updated quote data about a particular financial instrument. Market makers 130 may continue to provide updated quote data to system 100 for the particular products of interest. As a result, system 100 may receive, from the one or more dealer systems 130 on a recurring basis for a period of time (or a predetermined period of time), quote data with respect to the financial instrument and designated clearing houses identified in the CCP attribute (see, e.g., FIG. 4, ref 418). The system 100 may send the updated quote data to the user 120. After the time period expires, the system 100 may stop sending the updated quote data to the user 120. In one example, the enhanced RFQ 206 may be an open RFQ that requests streaming quote data 220A from both the market makers 130 associated with system 100 and also with external platforms (e.g., SEF 200 and DCM 212). Advantages of such a system are numerous.

Continuing with the example referencing FIG. 3, the received data (e.g. market data, quote data, order data, etc.) may be organized as market by order (MBO), market by price, or in another format. For market by order, the data may be anonymous or non-anonymous. For market by price, the aggregated book may be multiple levels deep such that, in addition to the best bid and ask prices, the price attribute may store the next N best bid and ask prices, where N is a number greater than one (e.g., two, five, ten, etc.) In one example, the price attribute of the enhanced financial instrument may take the form of an array data structure. In some examples, multiple levels of data (e.g., bid/ask prices) may be available for those clearing houses where the user's orders are actionable, but might or might not be available from other clearing houses. The price corresponding to each clearing house/etc. may depend on one or more of the following factors including, but not limited to, the price to clear at a clearing house, cross-margining benefits, and other factors. Referring to the illustrative price matrix (e.g., clearing house matrix) of FIG. 3, the GUI 300 may include pricing information for various clearing houses (or other entities—e.g., designated contract markets (DCMs) and other non-SEFs 212). For example, in one example, the pricing information for clearing house A (140A) may be displayed on chart 302. Meanwhile, the pricing information for clearing house B (140B) may be displayed on chart 304, and the pricing information for clearing house C (140C) may be displayed on chart 306. In other examples, the pricing information for the multiple clearing houses may be integrated into a single chart (or 2-dimensional or 3-dimensional graph) and compared side-by-side. A user of computing system 120 may view the GUI 300 on a visual display (e.g., LCD display) of computing system 120 and benefit from a side-by-side comparison of pricing as compared to each clearing house. In addition, in some examples, the generated information for display to the user may include a best bid price and best ask price across all of the clearing houses, or alternatively, across all of the clearing houses at which the user's orders are actionable (i.e., a first indication). As explained herein, one of ordinary skill in the art will appreciate after review of the entirety disclosed herein that not every clearing house's (or other entities) pricing may be displayed and/or actionable on GUI 300, per preferences and/or restrictions on the user's account/settings.

Figure 2:
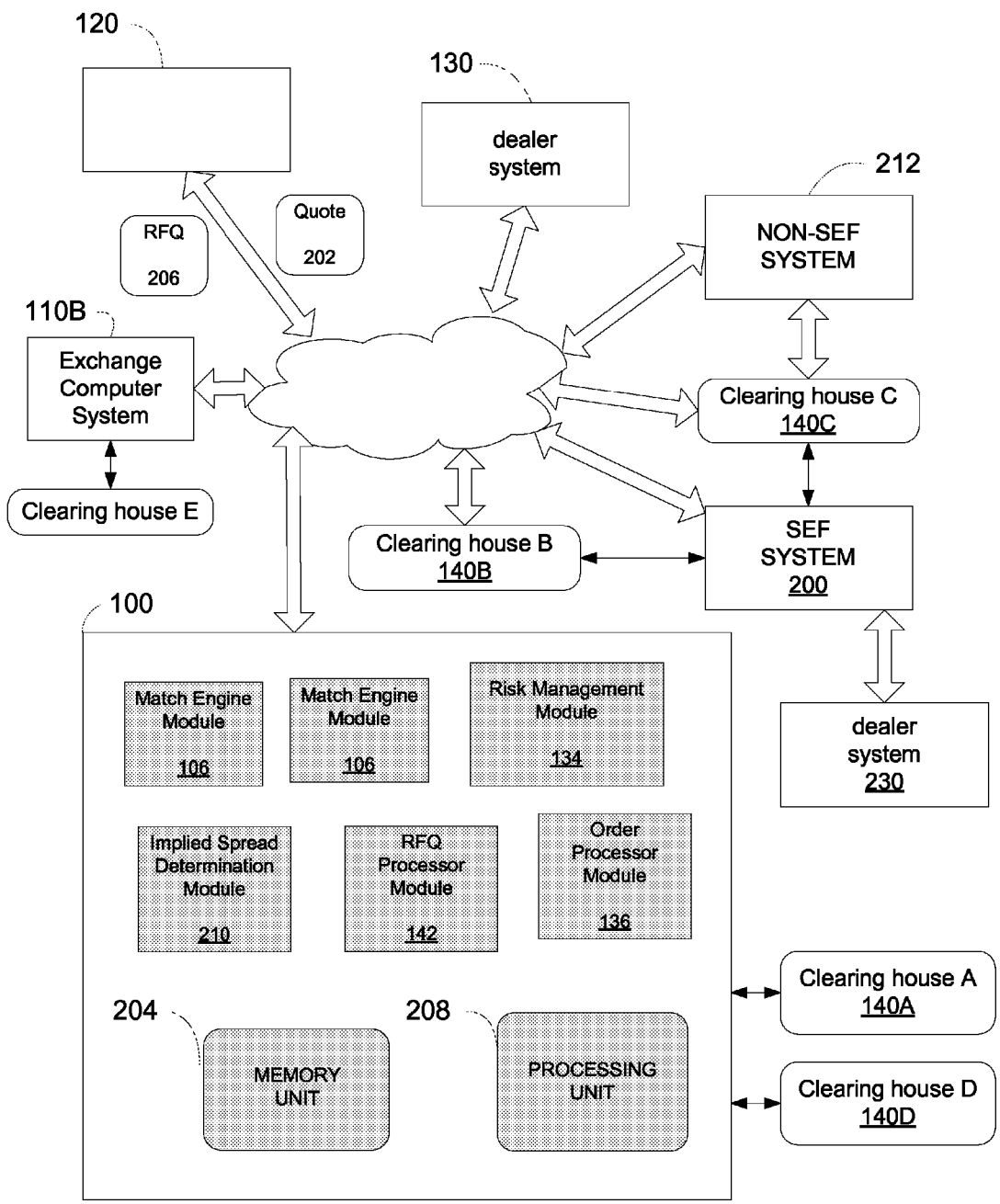
FIG. 2 illustrates a portion of an illustrative computer network system that may be used to implement various aspects of the systems disclosed herein.

In one embodiment in accordance with aspects of the disclosure, implied orders may be generated/processed using some information from one or more eRFQs. Referring to FIGS. 1 and 2 of Appendix E of U.S. Provisional Patent Application Ser. No. 61/438,933, a quote processor module and implied spread determination modules are illustrated that may be used in accordance with various aspects of the disclosure herein. For example, an eRFQ may include an indication/request, in addition to requesting a quote of an OTC product (e.g., swap agreement), for a quote on a futures contract or other related product for a user (e.g., trader using computing device 120) to trade for, among other things, hedging purposes. In some embodiments an automatic hedging feature may be included to permit certain automatic safeguards.

In one embodiment in accordance with various aspects of the above examples, a method is contemplated comprising: receiving, using a RFQ processor module 142, an eRFQ for a financial instrument, where the eRFQ includes an attribute/term for indicating one or more clearing houses (e.g., a selected clearing house); sending, using the request for quote processor module, the financial instrument associated with the eRFQ to implied spread determination modules at a plurality of regulated trading platforms (e.g., SEFs) or clearing houses; determining, using the implied spread determination module, that the financial instrument associated with the eRFQ in combination with one or more resting orders creates an implied spread that may be cleared at a desired clearing house, the implied spread comprising multiple legs, a first of the multiple legs corresponding to the financial instrument associated with the eRFQ and a second leg of the multiple legs corresponding to a resting order of the one or more resting orders; and sending, using the implied spread determination module, a notification of the implied spread to the electronic match engine of a trading platform system (e.g., SEF) for matching, the matching including executing all the multiple legs of the implied spread. One or more features disclosed in Appendix E of U.S. Provisional Patent Application Ser. No. 61/438,933 (e.g., pages 28-32 of the Appendix) may be included in the aforementioned method involving eRFQs.

Figure 5:
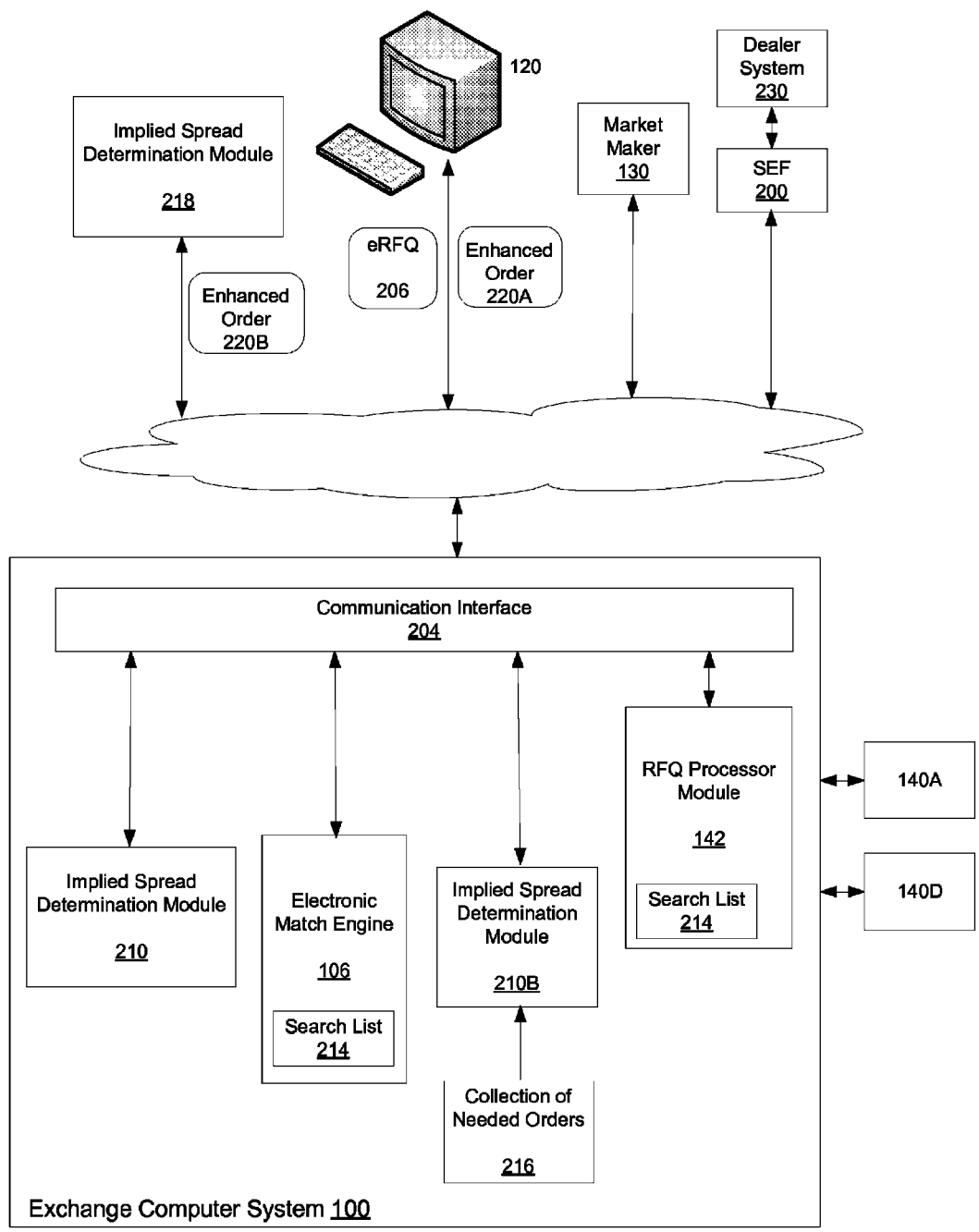
FIG. 5 shows a system that may be used to match implieds in accordance with an embodiment of the disclosure.
Figure 6:
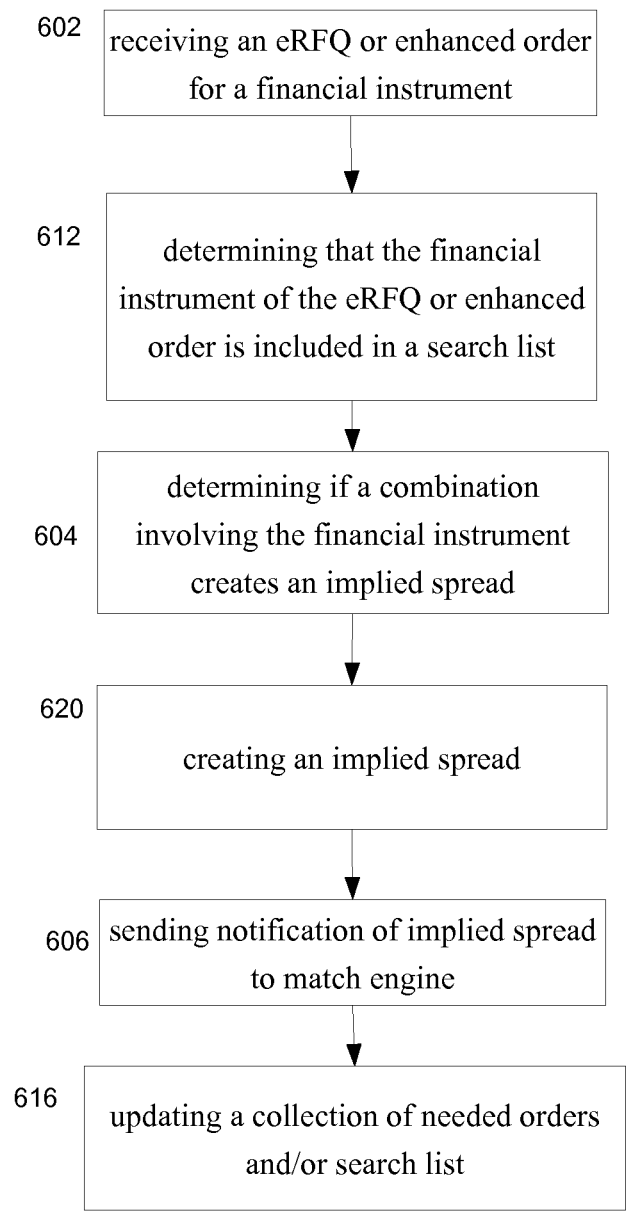
FIG. 6 illustrates a method for identifying implied spreads, in accordance with various aspects of the systems disclosed herein.

For example, FIG. 5, which is reproduced using Appendix E of U.S. Provisional Patent Application Ser. No. 61/438,933, shows a system that may be used to match orders in accordance with an embodiment of the disclosure. In one embodiment, the system of FIG. 5 may be used to receive new enhanced orders 220A that are used to focus an implied spread determination module 210 on particular financial instruments for which implied spread orders may exist. In another embodiment in accordance with the disclosure, the system of FIG. 5 may be used to direct an implied spread determination module 210 as to which financial instruments to perform analysis on to determine if implied spread orders may exist. Along these lines, FIG. 6 illustrates a method for determining implied spreads in accordance with various embodiments of the disclosure; in particular, FIG. 6 shows a method for focusing the computations involving in identifying existing implied orders on order books.

In accordance with one embodiment of the disclosure, a new enhanced order 220 for a financial instrument may be received at an exchange computer system 100. The new enhanced order 220 may be an outright order for a single futures contract or any other financial product (e.g., an options contract, a derivative product, security, bond, etc.) Alternatively, the new enhanced order 220 may be a spread order with a butterfly, crack, or other configuration. The new enhanced order 220 may be received at communication interface 222 in exchange computer system 100. In one embodiment, the communication interface 222 may be an input/output (I/O) port on a communications card (e.g., an Ethernet card) on a computing device at the exchange computer system 100. Alternatively, the communication interface 222 may be in communication with a user's computing device 120 that permits the user to enter/select an enhanced order. One skilled in the arts will appreciate that the communication interface 222 may be used to communicate with a variety of devices and/or modules inside or outside an exchange.

The new enhanced order may be sent to an implied spread determination module 210 to determine if the new enhanced order in combination with one or more pending orders creates an implied spread. Meanwhile, the new enhanced order 220 may also be nearly simultaneously submitted to the electronic match engine 106 for processing. As described in greater detail in commonly assigned, U.S. patent application Ser. No. 11/617,915, entitled "Template Based Matching," which is herein incorporated by reference in its entirety and was previously incorporated by reference in its entirety in a priority application to this filing, match engine module 106 may attempt to match new enhanced order 220 to data included in a collection of almost matched orders and pending orders included in various order books. The collection of almost matched orders and/or various order books may be stored in a memory accessible to a microprocessor used to implement a match engine. In addition, this disclosure, as described herein including in the materials incorporated by reference, contemplates examples where implieds may also undergo normal central limit order book processing across clearing houses.

Sometime during or after the time the electronic match engine 106 receives the new enhanced order, the implied spread determination module 210 may perform in parallel (or alternatively, in serial) the step of determining if any implied spreads are created using the new enhanced order 220. Some benefits of an in-parallel embodiment include reduced match engine 106 workload and quicker response times from match engine 106. In addition, as depicted in FIG. 5, the implied spread determination module may be positioned in various locations. For example, an implied spread determination module 218 may executed at a remote computer outside the exchange and generate implied orders 220B. The remote computer may be a computer located physically outside an exchange, but controlled by the exchange. Alternatively, the remote computer may be a trader's computer 120. In yet another example, the implied spread determination module 210 may be running in a processing thread on a computer located inside the exchange and running in parallel with one or more other implied spread determination modules 210A, 210B. Therefore, numerous implied spread determination modules 210A, 210B, 218 may be running in parallel with each other (e.g., different modules may each be searching some portion or depth of the possible implied space). Moreover, the implied spread determination modules 210A, 210B, 218 may be running simultaneous with the electronic match engine 106. At least one benefit of such a parallel processing distributed architecture is the greater computational power available at a given time.

Figure 7:
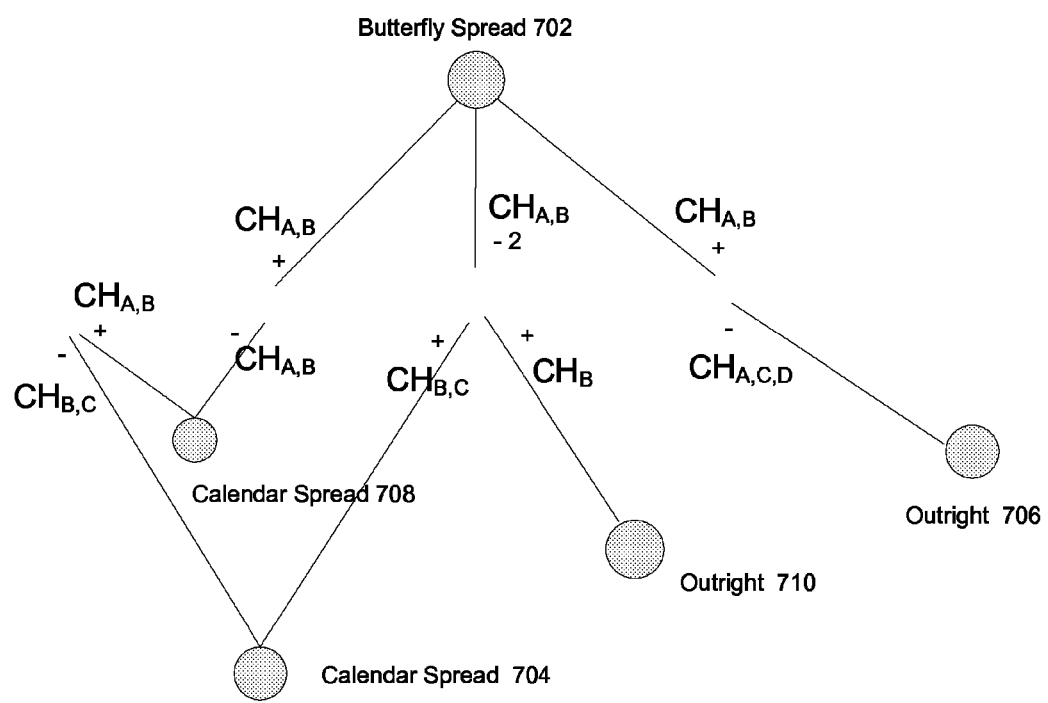
FIG. 7 shows a possible implied spread that consists of orders for a butterfly spread, two calendar spreads, and outright orders in accordance with an embodiment of the disclosure.

Referring to FIG. 6, which is reproduced using Appendix E of U.S. Provisional Patent Application Ser. No. 61/438,933, shows that an implied spread determination module 210 may determine (in step 604) if any implied spreads can be created involving the financial instrument of an enhanced order 220 or an enhanced request for quote (eRFQ) 206 received in step 602. In one embodiment, order books are analyzed to generate a collection of needed orders 216 that each when combined with one or more existing orders meet the requirements of one of the acceptable trade templates. Trade templates are discussed in greater detail in commonly assigned, U.S. patent application Ser. No. 11/617,915, entitled "Template Based Matching," which is herein incorporated by reference in its entirety and was previously incorporated by reference in its entirety in a priority application to this filing. The implied spread determination module 210 may compare, inter alia, any new enhanced orders 220 and pending orders related to the financial instrument of the eRFQ 206 to the collection of needed orders 216. If any of these orders match one of the needed orders, the implied spread determination module 210 may create an implied spread. In addition, before the implied spread is created, the implied spread determination module may confirm/verify (in step 604) that the CCP attribute of all the matched orders are such that the matched legs may be cleared by an appropriate clearing house. As explained in an earlier example, an incoming eRFQ 206 (or enhanced order 220A) may designate one or more clearing houses in its CCP attribute. This designation indicates that only particular clearing houses may be appropriate for the financial instrument corresponding to the eRFQ (or enhanced order 220A), and thus information about (or clearing with) those designated clearing houses is desired, as illustrated in FIG. 7. Moreover, as also explained in the earlier example, one or more modules/components/system (e.g., implied spread determination module 210A) illustrated in FIGS. 1 and 2 of Appendix E of U.S. Provisional Patent Application Ser. No. 61/438,933 may be incorporated to enable the features contemplated/disclosed herein. For example, in determining whether an implied may be created, the implied spread determination module may determine the ability of a particular product to clear at a specific clearing house; that ability may be governed by a clearing relationship and/or a user's desire/ability to clear at a specific clearing house.

In one example, the implied spread created (in step 620) by the implied spread determination module 210 may comprise multiple legs. For example, the implied spread may include a first leg corresponding to a new enhanced order 220 and a second leg corresponding to a pending order. In one example, the new enhanced order 220 may be the order that completes the unmatched leg of an implied spread awaiting a match. The number of legs in the implied spread may be dependent on the resources (e.g., amount of processing power and time) available to the implied spread determination module 210 to attempt to identify possible implied spreads.

After the implied spread determination module 210 determines that an implied spread exists, a notification may be sent (in step 606) through a communication interface 222 to the electronic match engine 106 informing the engine of the matching combination. The notification may be intra-exchange (i.e., within a single exchange or trading platform) or inter-exchange (i.e., between one or more exchanges or trading platforms) communication. For example, referring to FIG. 2, an exchange system 100 may send a notification to another exchange (e.g., a competing exchange 100B) with the appropriate information to execute and/or clear the implied spread. As explained previously herein, some clearing houses may be associated with an exchange system such that access to the clearing house may be restricted to only communication from that exchange. The notification may comprise order book identifiers (and other information) that permit the matching engine at the appropriate exchange to, in one embodiment, verify that all legs of the implied spread are valid. For example, the identifiers may be used to check the appropriate order books to verify that the appropriate resting orders are still unmatched. One skilled in the art will appreciate that a communication interface 222 may include an input/output (I/O) port on a communications card (e.g., an Ethernet card) on a computing device at the exchange computer system 100. Alternatively, information may be sent through the communication interface 222 to an output device (e.g., a display monitor) to alert a user (e.g., manager) of an exchange that an implied match exists so the user may respond accordingly.

Using the information provided in the notification, the electronic match engine 106 matches (e.g., executes) all of the multiple legs of the implied spread. The generation and matching/execution of the implied spread order that includes the particular financial instrument may create trading activity for the particular financial instrument. Such trading activity provides information (e.g., current trading price) that may be used in various ways. In one example, an implied feed may be generated for each clearinghouse (140A, 140B, 140C, 140D) corresponding to market data associated with its respective clearinghouse. In another example, a single, aggregated feed may be generated for all implieds. In a third example, different implied feeds may be aggregated and filtered as appropriate at the order book (e.g., order book module 110). It will be apparent to one of skill in the art after review of the entirety disclosed herein that this disclosure contemplates implied feeds with market data comprising a CCP attribute to designate one or more clearing houses.

Using the information provided in the notification, the plurality of trades that match the legs of the implied spread may be contemporaneously executed such that all of the trades are executed before a material change in the appropriate markets. The abundance of processing power at the electronic match engine 106 is at least one factor that permits the matching of the legs of the implied spread with minimal or no legging risk. For example, after an implied spread determination module 210 has identified the corresponding legs of an implied transaction, the electronic match engine 106 may execute the implied transaction inline without requiring a locking of the markets involved. In alternate embodiments, an exchange may lock one or more markets for the orders involved to eliminate possible legging risk. For example, in scenarios requiring inter-exchange communication, as described above, to execute and/or clear an implied spread some locking may be desirable.

The electronic match engine 106 may be configured to determine if a new enhanced order 220 or a pending order in combination with one or more pending orders for particular financial instruments creates an implied spread. In some embodiments, the electronic match engine 106 may limit the determination to only those financial instruments located in a search list 214. The search list 214 may comprise a plurality of financial instruments that are cleared to be monitored for determining implied spreads. The new enhanced order 220 may be compared to the search list 214 before determining if an implied spread is created. At least one benefit of such an embodiment is that it allows an exchange to restrict the electronic match engine 106 from searching a potentially unlimited number of new enhanced orders for implied spreads by focusing it on those financial instruments of new enhanced orders that it believes may be more conducive to an implied spread.

In another example in accordance with various aspects of the disclosure, the RFQ processor module 142 (or another comparable module) may determine (in step 612) if the financial instrument associated with an incoming eRFQ 206 may be used to determine (in step 604) if an implied spread may be generated. In one example, a search list 214 may be used to further this determination (of step 612). The search list used by the RFQ processor module 142 may be the same or a different list as the search list used by the electronic match engine 106. If a match is found in the search list 214, the RFQ processor module 142 may be configured to submit a request to an implied spread determination module 210 (e.g., implied spread determination modules 210A, 210B, or 218) to determine (in step 604) if an implied spread may be generated using one or more pending orders for the particular financial instrument of the eRFQ 206. One skilled in the art after review of the entirety disclosed herein will appreciate that at least one benefit of such an embodiment is that it allows an exchange to focus the potentially unlimited number of combinations that may possibly lead to implied spreads, thus enhancing efficiency of processing and/or memory consumption.

In one example, the search list 214 of RFQ processor module 142 may comprise a plurality of financial instruments (or a name of a predefined group of financial instruments) that are to be monitored to determine implied spreads. In an alternate embodiment, the search list 214 may be the inverse of the prior example. In other words, the search list 214 may comprise those financial instruments which the RFQ processor module 142 should exclude from acting as a trigger for determining implied spreads. At least one purpose of such an embodiment may be to prevent particular financial instruments with historically high liquidity from overloading the exchange computer system 100 and/or implied spread determination module 210. In yet another embodiment, the search list 214 may serve as a switch to turn on and turn off various functionality. For example, the search list 214 may be temporarily cleared when the generation of implied spreads is to be turned off. Accordingly, the search list 214 may act as a switch to prevent additional load on the system due to implied spread generation. The search list 214 may be restored (i.e., undoing the temporary clearing) when such functionality is desired to be turned on again.

Furthermore, in one embodiment in accordance with aspects of the disclosure, the search list may be updated (in step 616) based on the determining occurring in an implied spread determination module 210. As such, the search list may be an adaptive list that allows electronic match engine 106 to try to detect implied spreads where there is a higher probability of finding them. This may be determined based on past success, market conditions, submitted enhanced request for quotes (eRFQs) and/or through monitoring activity of the implied spread determination module 210 and/or the electronic match engine 106 itself.

Likewise, the operation of an implied spread determination module 210 may be adjusted based on prior findings of implied spreads. For example, the collection of needed orders 216 may be updated (in step 616) based on the determination of implied spreads occurring in the implied spread determination module 210. As such, the collection of needed orders 216 may be dynamically adjusted to identify those financial instruments that have a higher probability of contributing to an implied spread. Like the search list 214, the adjustment may be based on past success, market conditions, submitted enhanced request for quotes (eRFQs) and/or through monitoring activity. In one embodiment in accordance with various aspects of the disclosure, an implied spread determination module 210 may include its own search list. Such a search list may operate similar to search list 214 to enhance the operation of the implied spread determination modules 210A, 210B, 218.

In another embodiment in accordance with various aspects of the disclosure, the RFQ processor module 142 may receive an eRFQ 206 and submit the financial instrument (i.e., an identifier of the financial instrument) associated with the eRFQ to an implied spread determination module 210A, 210B, 218. In some examples the RFQ processor module 142 may consult with a search list 214, as described above, before requesting the implied spread determination module 210 begin determining (in step 604) if implied orders exist. In some embodiment, the implied spread determination module may automatically stop calculations to determine (in step 604) if an implied order exists after a predefined amount of time has passed. For example, the implied spread determination module may receive a financial instrument from RFQ processor module 142 at time t1. A timer in the implied spread determination module 210 may begin counting down starting at time t1 for a predefined amount of time (e.g., 0.5 seconds, 1 second, 5 seconds, 10 seconds, 30 seconds, less than 1 minute, etc.) and stop calculations once the timer expires. One skilled in the art will appreciate that a timer is just one way of calculating the passage of time and other components (e.g., counter, clock, adder, etc.) for accomplishing the function are contemplated by the term "timer." In addition, the aforementioned timer may be located in components outside of the implied spread determination module; for example, the timer may be located in the RFQ processor module 142, and upon expiration, the RFQ processor module 142 may instruct the particular implied spread determination module to stop further calculations. One skilled in the art will appreciate after review of the entirety disclosed herein that at least one benefit of a timer to regulate the determination performed by the implied spread determination module 210 is that it reduces the stress/load on the system created by memory/processor intensive implied determination calculations.

Referring to FIG. 7, which is reproduced using Appendix E of U.S. Provisional Patent Application Ser. No. 61/438,933, an implied spread determination module 210 in accordance with various aspects of the disclosure may identify an implied spread for an enhanced new order 710 (e.g., order 220) using pending enhanced spread orders 702, 704, 708, and an enhanced outright order 706. The enhanced new order 710 may be an order to buy 9700 oil future call contracts and clear only at clearing house B (140B). The implied spread determination module 210 may, inter alia, calculate that the legs of butterfly spread 702 may be combined with the legs of calendar spread 708 and calendar spread 704. Moreover, the implied spread determination module 210 may access the CCP attribute of each of the enhanced spread orders 702, 704, 708 to determine that the appropriate legs/orders may be matched to allow successful clearing of each leg/order. In this example, for the first leg of the butterfly spread 702, either clearing house A (140A) or clearing house B (140B) may be used to clear the match. A priority algorithm, such as whether a user/exchange has ranked a particular clearing house better than another, may be used to select between the possible clearing houses. In this case, clearing house A (140A) may be selected to clear the match after considering these preferences.

In addition, the module 210 may calculate that one of the two remaining unmatched legs of the enhanced butterfly spread 702 may be filled by a pending enhanced outright order 706. Moreover, the implied spread determination module 210 may access the CCP attribute of the enhanced outright order 706 to determine that the order may be matched to allow successful clearing of the order (e.g., order 706 designates clearing at clearing houses 140A, 140C, 140D, which overlap with clearing house 104A, which is designated by the appropriate leg of spread 702 in addition to other clearing house designations). The remaining unmatched leg in FIG. 7 may be an enhanced order to sell 9700 oil future call contracts and to be cleared only at clearing house A or clearing house B (140A, 140B) (e.g., CCP attribute of this leg of the enhanced spread order 702 designates clearing houses 140A, 140B). The implied spread determination module 210 may confirm that this unmatched leg and the enhanced new order 710 designate clearing at a common clearing house (i.e., clearing house 140B). In other words, the implied spread determination module 210 may determine that the CCP attribute of the enhanced new order 710 in combination with clearing house requirements of one or more resting orders (i.e., clearing house 140A, 140B) allow clearing of the leg of the spread order. As a result, the implied spread determination module 210 may match them to complete the implied order.

Therefore, the implied spread determination module 210 may send a notification to the electronic match engine 106 indicating that the combination of the pending orders 702, 704, 706, and 708 and new order 710 complete a match. The notification may include identifiers directing the match engine 106 to the appropriate order books to find the appropriate pending orders. In some examples in accordance with various aspects of the disclosure, as previously described herein, a matching order of an implied spread may be intra-exchange or even inter-exchange.

A notification may, in one embodiment in accordance with aspects of the disclosure, include order book identifiers without also including a copy of the enhanced orders. Since the best priced orders on an order book will be used for matching, the electronic match engine 106 may not necessarily require a copy of the enhanced order itself. Moreover, since new enhanced orders may arrive during any period of time, the system may further check the order book to identify any additional orders. In addition, such an embodiment allows those that only possess aggregate book information to take part in the process. For example a customer who only knows the number, clearing house requirement, and quantity of the orders present at a price level in an order book may be able to detect and transmit a possible implied without knowing the detailed information about orders on the book. Since the implied spread determination module 210 may be running, in some embodiments, in parallel with the match engine 106, the module 210 may be able to run through greater combinations of orders to determine if an implied spread may be formed.

In yet another example in accordance with various aspects of the disclosure, a user external to the exchange computer system 100, such as a user of a trading terminal 120, 118, 116, may monitor the market and order books to calculate an implied spread. The terminal 120 may send a new enhanced order 220A (e.g., an outright order, a synthetic spread order, etc.) to the exchange 100 that uses the implied spread to obtain an advantageous trade price. The enhanced order 220A includes a CCP attribute that may designate one, more than one, or no clearing houses for clearing the order. The new enhanced order may be in a recognized format (e.g., the FIX/FAST format) and include information in its message format that facilitates matching by an electronic match engine 106 of the new enhanced order 220A with the one or more pending orders. That information may include multiple order book identifiers or other information useful to the match engine 106 to match the enhanced order 220A. In one embodiment, the enhanced order may be marked as "Fill and Kill" or "Fill or Kill;" thus, further reducing the customer's risk by ensuring that the enhanced order does not rest on the order book if the implied matching possibility no longer exists. Moreover, the enhanced order may include an attribute (e.g., a CCP attribute) comprising an array of bits, where each bit of the array indicates whether a clearing house is allowed or restricted for clearing the enhanced order. In the example of a spread order, the CCP attribute may comprise an array of bits for at least each of the legs of the spread order.

The match engine 106 may, in some embodiments, verify the information that facilitates matching by confirming the status of pending orders that will be matched against the legs of the implied spread. The exchange computer system 100 may perform the verifying in the match engine 106 itself, or alternatively, delegate this activity to an implied spread determination module 210A where the verifying may occur in a separate thread running in parallel with the match engine 106. If the verification finds the implied spread to be valid, then a notification of the implied spread may be sent to the match engine 106 for executing all of the legs of the implied spread against the pending orders identified in the enhanced order 220. At least one advantage of executing all of the legs of the implied spread in a nearly simultaneous manner is that there is miniscule slippage risk. In some embodiments, a limit may be placed on the number of legs that may be submitted in an implied spread in order to guarantee that the legging risk is averted.

In addition, the implied orders generated in the aforementioned examples may work across the same clearing house (e.g., clearing house A—104A) or across multiple clearing houses based on a clearing matrix as previously described herein. For example, FIG. 3 may include two additional columns: a column for implied bid and a column for implied offer, per clearing house. In some instances, a user may prefer to designate (e.g., hedge at) different clearing houses for risk management reasons; thus, the user may define a user-defined spread (UDS) to obtain a desired set of contracts in a spread with each contract able to be at the same or different clearing houses. For example, a trading platform system 100 may fill a spread order and split the order such that sixty contracts are cleared with clearing house 140A and another forty contracts with clearing house 140B. While it's likely that the legs of a spread will be frequently cleared at the same clearing house, if the opportunity arises to match the legs at two different clearing houses for a great price, or some other benefit, the implied spread determination module 210 may clear accordingly.

In addition, some implieds may be generated at or near front-end systems (e.g., user computing device 120) and may show implied strategies across clearing houses, regulated trading platforms, and/or exchanges where a user may clear or trade. For example, a notification informing the electronic match engine 106 of a matching combination may comprise order book identifiers that permit the matching engine to, in one embodiment, verify that all legs of the implied spread are valid. In another example, the front-end system may provide implied logic in the case of an inter-clearing house spreading opportunity. In yet another example, the front-end system may aggregate and/or display implied opportunities across exchanges, clearing houses, and/or regulated trading platforms, and send one or more messages corresponding to an implied user-defined spread (UDS) to the exchange, clearing house, and/or regulated trading platform.

In yet another example, Appendix D of U.S. Provisional Patent Application Ser. No. 61/438,933 describes a system in FIGS. 7 and 8 of that Appendix where trading engines at a front end interact with a matching system on the backend to monitor and regulate/manage risk and credit control. Such a system may limit, based on risk and credit controls, the ability of a user to clear at a particular clearing house. As a result, a price matrix displayed to such a user may or may not list blocked (e.g., undesirable or excluded/restricted by user/system settings, etc.) clearing houses and their corresponding pricing information. In alternate embodiments, a clearing matrix (e.g., GUI 300 in FIG. 3) may have the particular clearing house's prices grayed out (e.g., incapable of being selected; non-actionable) but still be displayed to the user. In some examples, GUI 300 may indicate that a price is non-actionable if the user wishing to act on the price cannot trade at the particular clearing house (e.g., does not have a relationship with that clearing house). The clearing matrix (e.g., GUI 300 in FIG. 3) may format information about a first clearing house (e.g., received bid and ask prices from the first clearing house) in a first style (e.g., color, font type, size, italics/bold/underline, not visible, etc.), but format information about a second clearing house in a second style.

In addition, the identification and processing of potential implied spreads inside electronic trading systems sometimes consumes substantial processing resources. Appendix F of U.S. Provisional Patent Application Ser. No. 61/438,933 describes systems and methods for, among other things, minimizing communication bandwidth consumption among parties trading derivative products and other types of financial instruments. The systems and methods of Appendix F of U.S. Provisional Patent Application Ser. No. 61/438,933 may be incorporated or used with the systems and methods disclosed herein. For example, by linking the spread and outright markets, implied spread trading increases market liquidity. Examples of implied spread trading include those disclosed in U.S. patent application Ser. No. 10/986,967, entitled "Implied Spread Trading System," which is incorporated herein by reference. Large exchanges typically have order books for numerous spread products and legs of the spread products. The identification and processing of potential implied spreads inside electronic trading systems consumes sometimes substantial processing resources. Appendix F of U.S. Provisional Patent Application Ser. No. 61/438,933, entitled "Method and System for Providing Option Spread Indicative Quotes," describes systems and methods for, among other things, minimizing communication bandwidth consumption among parties trading derivative products and other types of financial instruments.

For example, market makers 130 in the examples of Appendix F of U.S. Provisional Patent Application Ser. No. 61/438,933 may quote a financial instrument differently with respect to the clearing houses at which it will be cleared, and that quote data may be received at a SEF (e.g., a regulated trading platform 100) and used to facilitate derivation of indicative quotes for one or more financial products, as described in Appendix F of U.S. Provisional Patent Application Ser. No. 61/438,933. For example, in the case of a hybrid RFQ, an enhanced RFQ 206 may be sent to system 100 to request indicative quote data. The indicative quote data may be packaged as a message including a plurality of price quotes (e.g., with respect to clearing houses designated in the CCP attribute, or generally with respect to all clearing houses). The indicative price quotes are non-binding and non-actionable. The system 100 sends (see, e.g., FIG. 4, ref 416) the message comprising the plurality of non-binding, non-actionable price quotes to one or more subscribers 130. Moreover, one skilled in the art will appreciate after review of the entirety disclosed herein (including Appendix F of U.S. Provisional Patent Application Ser. No. 61/438,933) that the other examples and features disclosed in Appendix F of U.S. Provisional Patent Application Ser. No. 61/438,933 are contemplated by this disclosure for use with the examples described herein. Referring to FIG. 2, SEF systems (e.g., computing system 100) may be in communication with a designated contract market (DCM, such as non-SEF systems 212) and/or clearing house (e.g., 140B, 140C, 140A, etc.) In some examples, a SEF system may communicate through a non-SEF system 212 in order to clear at a particular clearing house 140C. In other instances a clearing house 140B may be available to all trading platforms. In another embodiment, clearing house A (140A) may only be available through a particular trading platform (e.g., 100). Implied orders, RFQs, and other requests/submissions may be made across non-SEF 212 and SEF 200 systems. In some examples, a single computing system 100 (e.g., match engine module 106) may include both SEF service and non-SEF services.

Regarding an automatic hedging feature in accordance with various aspects of the disclosure, some OTC products (e.g., swaps, IRS, CDS, currency swaps, etc.) may be hedged with a product in a futures market or other market. In many instances, a futures product may have greater liquidity than an OTC product. As such, a user (e.g., user of computing system 120) may desire to hedge his/her OTC market risk with purchases on a futures market. In one example, the hedge may be specified to trade at a different or selection of clearing houses. In another example, a user may submit a trade for an IRS (fixed or floating) with a hedge in a basket of Eurodollars. The user may submit a RFQ (or other order type, e.g., a covered call) that assist in deciding whether to automatically hedge the IRS trade. In the RFQ, the user may indicate non-swap (e.g., forward rate agreements) and cause the system 100 to generate implieds and quote those. When products are not listed on an exchange 100, the exchange may look to other platforms (e.g., SEF 200) or clearing houses or DCMs (e.g., non-SEF systems 212). The SEF and non-SEF systems may interact to obtain the desired information. In some instances, a user may prefer to hedge at different clearing houses for risk management reasons; thus, the user may define a user-defined spread to obtain a desired set of contracts in a spread with each contract able to be at the same or different clearing houses. For example, a trading platform system 100 may fill a spread order and split the order such that sixty contracts are cleared with clearing house 140A and another forty contracts with clearing house 140B.

Regarding risk management module 134, in another embodiment in accordance with various aspects of this disclosure, a regulated trading platform (e.g., system 100) may interact with numerous clearing houses (e.g., 140A, 140B, 140C, etc.) and other entities (e.g., non-SEF system 212, DCMs, etc.) The trading platform 100 may include a risk management module 134 as described herein. The risk management module 134 may compute and determine the amount of risk associated with a financial product or portfolio of financial products. Moreover, in some examples, risk management by the module may be done for a specific clearing house risk value or across a user-defined set of clearing houses (e.g., 140A-104C). In other examples, it may be done by user/trader, clearing firm, product, margin, etc. In yet another example, the risk may be aggregated as described in Appendix C of U.S. Provisional Patent Application Ser. No. 61/438,933. For example, FIGS. 7, 8, and 9 of Appendix C of U.S. Provisional Patent Application Ser. No. 61/438,933 illustrate a system where risk (e.g., corresponding margin requirements) may be calculated and adjusted based on calculations performed by the module 134. While those figures of Appendix C of U.S. Provisional Patent Application Ser. No. 61/438,933 reference a system interacting with numerous exchanges, it will be appreciated that the same type of interactions are applicable in this disclosure where a system 100 may interact with numerous clearing houses (e.g., 140) and/or other entities (e.g., non-SEF systems 212).

For example, applying the teachings of Appendix C of U.S. Provisional Patent Application Ser. No. 61/438,933, system 100 may send messages alerting users and/or other entities about risk thresholds and risk levels. For example, a SEF (e.g., trading system 100) may have access and exposure to multiple clearing houses. As such, the SEF may set a single credit limit across one or more of the clearing houses. The SEF may set a limit on the amount of risk allowed at one clearing house (140A), but allow other clearing houses (140B) to allow greater risk. The SEF may recognize that a user/trader holds a long position in a financial instrument at clearing house A (140A) and a short position in the same financial instrument at clearing house B (140B). As a result, the SEF may uniquely assess the risk of the user's positions and may approve or reject the processing of the user's trades or requests.

In one example, a system for monitoring risk associated with orders placed at a trading platform is disclosed. The system may comprise: an interface to a plurality of clearing houses, one or more of these clearing house including a total credit parameter associated with a maximum aggregate risk parameter for the clearing house; and at least one credit control module communicable with the plurality of clearing houses, the credit control module receiving orders/trades and communicating a quantity definition to determine the value of orders placed on each individual clearing house; wherein if the value of orders exceeds a predetermined amount of the quantity definition, the credit control module requests an increase in credit from the order routing mechanism to another clearing house. In an alternate embodiment, the credit control module may route, based on user/system preferences, orders to be cleared to another clearing house with available credit.

As referenced in Appendix C of U.S. Provisional Patent Application Ser. No. 61/438,933, a credit control module may assist in implementing one or more of the aforementioned features. It will be appreciated that although some of the credit controls described in Appendix C of U.S. Provisional Patent Application Ser. No. 61/438,933 may be described with respect to exchanges or trading engines, the disclosure herein additionally contemplates credit control modules with respect to multiple clearing houses, users/traders, and other party (e.g., clearing firms). In addition, a clearing house 140B in communication with multiple trading platforms (e.g., SEF 200 and non-SEF system 212) may provide asynchronous credit controls (through a credit control module executing on its computing systems) across different SEFs and non-SEF systems.

FIG. 1 depicts an illustrative operating environment that may be used to implement various aspects of the invention. The operating environment is only one example of a suitable operating environment and is not intended to suggest any limitation as to the scope of use or functionality of the invention. Aspects of the present invention are preferably implemented with computing devices and networks for exchanging, transmitting communicating, administering, managing and facilitating trading information including, but not limited to performance bond amount requirements and trading information. An exchange computer system 100 receives market data, analyzes historical data, calculates, and disseminates various values, e.g., accrued amounts associated with the declining balance methodology, historical accrual amounts, daily settlement price adjustments, cash payment etc., in accordance with aspects of the invention.

Exchange computer system 100 may be implemented with one or more mainframes, servers, gateways, controllers, desktops or other computers. The exchange computer system 100 may include one or more modules, processors, databases, mainframes, desktops, notebooks, tablet PCs, handhelds, personal digital assistants, smartphones, gateways, and/or other components, such as those illustrated in FIG. 1. Moreover, computer system 100 may include one or more processors 208 (e.g., Intel® microprocessor, AMD® microprocessor, risk processor, etc.) and one or more memories 204 (e.g., solid state, DRAM, SRAM, ROM, Flash, non-volatile memory, hard drive, registers, buffers, etc.) In addition, an electronic trading system 138, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. The trading system may include a trading system interface having devices configured to route incoming messages to an appropriate devices associated with the trading system. The trading system interface may include computers, controllers, networks, gateways, routers and other electronic data processing and routing devices. Incoming messages may be received directly or indirectly (e.g., over the Internet, over a wired or wireless network, etc.) from a computing device 120 of a user and sent to a trading platform system 100. Orders that are placed with or submitted to the trading system are received at the trading system interface. The trading system interface routes the order to an appropriate device. A trading engine computer system 100 receives orders and transmits market data related to orders and trades to users.

A user data store (e.g., user database 102) may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

A match engine module 106 may match bid and offer prices for orders configured in accordance with aspects of the invention. Match engine module 106 may be implemented with software that executes one or more algorithms for matching bids and offers for financial instruments in accordance with aspects of the invention. The match engine module 106 and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed.

Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). A confirmation message may be sent when the match engine module 106 finds a match for an order and the order is subsequently executed. The confirmation message may, in some embodiments, be an e-mail message to a trader, an electronic notification in one of various formats, or any other form of generating a notification of an order execution.

Furthermore, an order book module 110 may be included to compute or otherwise determine current bid and offer prices. The order book module 110 may be configured to calculate the price of a financial instrument. A risk management module 134 may be included in computer system 100 to compute and determine the amount of risk associated with a financial product or portfolio of financial products. An order processor module 136 may be included to receive data associated with an order for a financial instrument (e.g., an enhanced financial instrument). The module 136 may decompose delta based and bulk order types for processing by order book module 110 and match engine module 106. The order processor module 136 may be configured to process the data associated with the orders for financial instruments or additional attributes to handle post-trade routing. In some examples, the order processor module 136 may process the enhanced financial instrument by removing a clearing house attribute in the enhanced financial instrument before sending to a clearing house. At least one reason, among others, for removing the clearing house attribute in the enhanced financial instrument before sending to the clearing house may be for backwards compatibility reasons; the clearing house does not necessarily need to be aware of this attribute in order to perform its functions.

Similar to an order processor module 136, a request for quote (RFQ) processor module 142 may receive requests for quotes (referred to as RFQs or eRFQs) from traders operating computer devices 114, 116, 118, 120, 122. The RFQ processor module 142 may also receive RFQs from other sources, including, but not limited to an exchange, regulated trading platform (e.g., SEF), and/or clearing houses 140. RFQs may include information about the terms related to a financial instrument, such as price, instrument identifier, CCP attribute, expiration date (in the case of an options contract), external trading platform attribute (e.g., other SEFs and non-SEF systems to use) and/or other terms known to those skilled in the art. The RFQ processor module 142 may receive the RFQ and communicate with market makers 130 and/or traders to obtain a response to the RFQ. For example, the RFQ processor module 142 may broadcast RFQs to subscribers (e.g., market makers 130, traders, etc.) to inform them that quotes are requested on particular financial instruments. In some instances no response may be obtained and the RFQ may remain unanswered. In other embodiments, the RFQ processor module 142 may be able to provide information to the requesting entity/individual (e.g., a trader).

Exchange computer system 100 may also include an implied spread determination module 210. The implied spread determination module 210 may be used to determine if an enhanced order (e.g., an order including at least a CCP attribute) in combination with one or more pending unmatched orders (i.e., resting orders) in an order book creates an implied spread. The implied spread determination module 210, 218 may perform the determination in parallel with and/or apart from the electronic match engine 106 in the exchange. Furthermore, as graphically depicted in FIG. 5, the implied spread determination module 210, 218 may be located inside or outside the exchange computer system 100. For example, the implied spread determination module 218 may be located in a remote computer system 120 outside the exchange computer system 100. In another embodiment, the module 210A, 210B, 218 may have multiple instances running inside and outside the exchange. One skilled in the art will recognize that the implied spread determination module 210, 218 may be implemented using programming code (e.g., C++, C, Java, etc.) and executed on a processor located in a computing device. The programming code may include common elements of software programming, such as "for loops", "do-while loops", function calls, if-else syntax, "switch" syntax, and other well known elements. Similar such programming code may be found in the various other modules and computer-readable instructions described throughout the disclosure.

In addition, a market data module 112 may be included to collect market data and prepare the data for transmission to users. In one embodiment, the market data module 112 may publish the value of the current accrual amount, and/or the daily settlement price adjustment amount, and/or the cash payment amount. The market data module 112 may regularly disseminate updates to a financial instrument, including updates to the financial instrument that may occur as values (e.g., dividend announcements) are reported. The market data may be reported anonymously, clearing firm specific, and/or broker/trader specific in some examples. In some embodiments in accordance with aspects of the invention, the market data module 112 may update the market data records of a financial instrument on a daily basis (e.g., at the end of each trading day).

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network (LAN) 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., risk processor), controllers, computers, clients, servers, gateways, networks of computers, and/or any combinations thereof. The computers, servers, gateways, may have one or more controllers configured to execute instructions embodied as computer software. For example, computer device 120 may include computer-executable instructions for receiving updated settlement prices, accrued amounts, and other information from computer system 100 and displaying to a user. In another example, computer device 118 may include computer-executable instructions for receiving market data from computer system 100 and displaying that information to a user. In yet another example, a processor of computer system 100 may be configured to execute computer-executable instructions that cause the system 100 to perform methods disclosed herein.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems, such as clearing house 140. Coupling can be direct as described or any other method described herein.

A clearing house 140 enables an exchange computer system 100 to provide contracts with mutualized risk of counterparty credit risk than over-the-counter (OTC) products. A clearing house 140 arranges for transactions to be settled and cleared. Clearing is the procedure through which a clearing house 140 becomes buyer to each seller of a contract (e.g., futures contract, equities, currencies, interest rate products, etc.), and seller to each buyer, and assumes responsibility for protecting buyer and seller from financial loss by assuring performance on each contract. A clearing house 140 may settle trading accounts, clear trades, collect and maintain performance bond funds, regulate delivery and report trading data. In some scenarios an exchange may operate its own clearing house 140 through a division of the exchange through which all trades made are confirmed, matched, and settled each day until offset or delivered. In other words, the exchange computer system 100 may be internal to the clearing house 140. Alternatively, one or more other companies may be provided the responsibility of acting as a clearing house 140 with the exchange (and possibly other exchanges). An exchange may have one or more clearing houses associated with the exchange. An exchange may offer firms qualified to clear trades to provide a clearing house 140 for the exchange computer system 100. In some instances, these clearing members may be designated into different categories based on the type of commodities they can clear and other factors.

The clearing house 140 may establish minimum performance bond (i.e., margin) requirements for the products it handles. A customer may be required to deposit a performance bond with the clearing house 140 (or designated account) for the purpose of insuring the clearing house 140 against loss on open positions. The performance bond helps ensure the financial integrity of brokers, clearing houses, and exchanges as a whole. If a trader experiences a drop in funds below a minimum requirement, the clearing house 140 may issue a margin call requiring a deposit into the margin account to restore the trader's equity. A clearing house 140 may charge additional performance bond requirements at the clearing house's discretion. For example, if a clearing house's potential market exposure grows large relative to the financial resources available to support those exposures, the clearing house 140 may issue a margin call.

In another embodiment, the clearing house 140 may require a larger performance bond based on a credit check (e.g., an analysis of the credit worthiness, such as using a FICO™ or comparable score, inter alia) of the customer/trader. The credit check may be performed (i.e., initiated) by a clearing house 140 or an exchange 100. In the example where the clearing house 140 performs the credit check, the clearing house 140 may send a message (e.g., enforcement message) to the exchange 100. If the credit check indicates that a customer/trader is a high risk, the enforcement message may increase the margin requirements of the customer/trader, or otherwise adjust the capabilities/constraints of the customer/trader commensurate with the higher risk. In the example where the exchange 100 initiates the credit check, the exchange 100 may send a message to one or more clearing houses associated with the exchange 100 to update them on the increased/decreased risk associated with the customer/trader.

In recognition of the desire to promote efficient clearing procedures and to focus on the true intermarket risk exposure of clearing houses, a cross-margining system may be used. By combining the positions of joint and affiliated clearing houses in certain broad-based equity index futures and options into a single portfolio, a single performance bond requirement across all markets may be determined. The cross-margining system may greatly enhance the efficiency and financial integrity of the clearing system.

The principal means by which a clearing house 140 mitigates the likelihood of default is through mark-to-market (MTM) adjustments. The clearing house 140 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

"Financial instruments" may include, but are not limited to, swap agreements, credit defaults swaps (CDS), interest rate swaps (IRS), forward rate agreements (FRAs), OTC equities, OTC foreign currency, derivative contracts, equities, currency swaps (FX), bilateral financial agreements, financial agreements involving a central clearing party/central counterparty (CCP), and other comparable financial instruments apparent to one of ordinary skill in the art after review of the entirety disclosed herein.

Of course, the methods and systems of the above-referenced embodiments may also include other additional elements, steps, computer-executable instructions, or computer-readable data structures. In this regard, other embodiments are disclosed and claimed herein as well. In other embodiments, the systems and methods may be partially or wholly implemented on a computer-readable medium, for example, by storing computer-executable instructions or modules, or by utilizing computer-readable data structures. These instructions may be executed by a processor of a computing device to perform one or more steps of the methods disclosed herein. The details of these and other embodiments are set forth in the accompanying drawings and the description herein. Other features and advantages of the disclosed method, systems, and apparatus will be apparent from the description, drawings, and appendices.

In addition, the present disclosure overcomes limitations of the prior art by providing methods and systems that provide for, among other things, an enhanced financial instrument comprising at least a clearing house attribute or desired clearing outcome. In one example, a method is disclosed for receiving, from a computing device of a user, an order for an enhanced financial instrument which identifies first and second clearing houses. The order may be matched and processed using a matching engine module and order processing module. The enhanced financial instrument may correspond to an over-the-counter (OTC) financial product available at a plurality of clearing houses including at least the first and second clearing houses. A computer processor may determine that orders of the user at the first clearing house are non-actionable, but that orders of the user at the second clearing house are actionable. The computer processor may submit the matched order to the second clearing house. In addition, in some examples, the aforementioned method may also include receiving, from an exchange, market data records (e.g., order data, etc.) that include a clearing house designation (e.g., a first clearing house, a second clearing house, etc.) The computer processor may generate information formatted for transmission and display at the user's computing device. Such information may, in some examples, comprise at least a part of the received market data records and be formatted to gray out those portions corresponding to the first clearing house, but render as selectable those portions corresponding to the second clearing house. Moreover, although the example above refers to market data (e.g., order data), the disclosure is not so limited. For example, a request for quote (RFQ) may be substituted in the prior example such that a user submits an enhanced RFQ that includes a CCP attribute to a request for quote processor module. In response, market makers and/or others may provide quote data/prices (e.g., indicative quotes) to users.

In another example, a computer processor may accesses a user data store or a user database to retrieve a user's settings. The user's settings may comprise one, two, or more of: a first indication of one or more of a plurality of clearing houses at which prices are non-actionable but viewable; a second indication of one or more of the plurality of clearing houses at which the prices are actionable; and a third indication of one or more of the plurality of clearing houses restricted from the user. In the foregoing example, the system may receive from the user's computing device a financial identifier corresponding to an enhanced financial instrument for an over-the-counter product available at a plurality of clearing houses including at least the first clearing house, second clearing house, and third clearing house. The system may then send market data records (e.g., order data) of the financial identifier that include the first indication (e.g., the first clearing house) and the second indication (e.g., the second clearing house) to the user's computing device. The market data records, in some examples, may include at least an attribute configured to identify a clearing house, a price (e.g., order price) attribute, and a financial identifier attribute. The system may generate information formatted for transmission and display at the user's computing device. Such formatting may, in some examples, be based on the user's settings including at least one of: a first style of graying out those portions corresponding to the first clearing house, and a second style of rendering as selectable those portions corresponding to the second clearing house. In addition, in some examples, the transmitted information may be formatted to be compatible for display as part of a scrolling, text-based messaging interface. In other examples the formatted transmitted information may be displayed as part of a matrix of clearing houses. Moreover, although the example above refers to market data (e.g., order data), the disclosure is not so limited. For example, the data formatted and/or rendered based on user settings may include quote data/prices from market makers and/or others, as described herein.

Furthermore, in some examples, the price attribute of the received market data records may store at least bid and ask prices of the financial identifier of the enhanced financial instrument. The bid and ask prices may be specific to the clearing house identified in the clearing house attribute. Moreover, in some examples, the bid and ask prices of particular clearing house may be multiple levels deep or market by order. In one example, the data records may be level 2 records showing order by order. While level 2 records may be for non-anonymous markets, the can also be provided for anonymous markets in some scenarios in accordance with various embodiments of the disclosure.

In yet another example, a computer system may register with an exchange to automatically receive up-to-date market data including a clearing house identifier (e.g., clearing houses identified in the second indication, clearing houses identified in the first indication) and a financial identifier. As a result, the exchange may transmit market data, which comprises at least a price attribute, a financial identifier attribute, and/or a clearing house attribute, to the computer system.

Regarding enhanced RFQs, a computer-assisted method is disclosed comprising one or more of the following steps: receiving, using a request for quote (RFQ) processor module in a computer system, an enhanced request for quote for a financial instrument (e.g., an outright order for a futures contract, a spread order for a futures contract, and an outright order for an options contract), wherein the enhanced request for quote comprises an attribute configured to identify at least one clearing house; accessing, by a computer processor in the computer system, a user data store to retrieve settings, which are described herein; accessing, using the RFQ processor module, the attribute of the enhanced request for quote to determine whether or not it identifies a third clearing house, which is defined in the settings; sending, using the RFQ processor module, the enhanced request for quote to one or more dealer systems (or a plurality of systems corresponding to market makers); receiving, from the one or more dealer systems (or market makers), a quoted price of the financial instrument with respect to each clearing house identified in the enhanced request for quote; sending, using the RFQ processor module, a message to at least one subscriber, wherein the message comprises a plurality of price quotes of the financial instrument with respect to different clearing houses, and wherein the behavior/distribution of the message varies based on whether the RFQ is a directed RFQ, open RFQ, or a hybrid RFQ (e.g., request for indicative quotes); sending, using the RFQ processor module, the enhanced request for quote to at least one of: a remote regulated trading platform and a remote DCM platform; and displaying the message on a user's computing system such that portions corresponding to a first clearing house are grayed out and portions corresponding to a second clearing house are rendered as selectable. One of skill in the art after review of the entirety disclosed herein, including U.S. Provisional Patent Application Ser. No. 61/438,933, which was previously incorporated by reference herein, will appreciate that one or more of the steps described herein may be optional and may be performed in an order different than recited above.

The present disclosure has been described herein with reference to specific exemplary embodiments thereof. It will be apparent to those skilled in the art that a person understanding this disclosure may conceive of changes or other embodiments or variations, which utilize the principles disclosed herein without departing from the broader spirit and scope of the disclosure as set forth in the appended claims. For example, although numerous examples recite swap agreements, one skilled in the art will appreciate that the novel principles disclosed herein may be applied to other types of financial instruments and still fall within the scope of the invention contemplated herein. In another example, the operation of generally determining and executing an implied spread is depicted for illustrative purposes in steps 620, 606, and 616 of FIG. 6; however, in some embodiments in accordance with various aspects of the disclosure, these aforementioned steps may be illustrated as a single high-level step for determining and clearing an implied spread associated with a financial instrument provided by the RFQ processor module 142. One or more of the steps may be optional and may be omitted from various embodiments. For example, in some embodiments locking may be omitted or replaced by a step that performs an equivalent function (i.e., of preventing legging risk), as described in U.S. patent application Ser. No. 12/176,130, which was previously incorporated by reference in a priority application to this filing.

We claim:

1. A computer-assisted method comprising:
   receiving, by at least one computer processor, an enhanced request for quote (eRFQ) at a request for quote processor module, wherein the eRFQ includes an attribute configured to identify at least one clearing house, wherein the eRFQ includes an inquiry regarding the current market for a financial instrument associated with the eRFQ;
   determining, by the at least one computer processor using an implied spread determination module, that the financial instrument associated with the eRFQ in combination with one or more resting orders creates an implied spread, the implied spread comprising multiple legs, a first of the multiple legs corresponding to the financial instrument associated with the eRFQ and a second leg of the multiple legs corresponding to a resting order of the one or more resting orders;

determining, by the at least one computer processor using the implied spread determination module, that the attribute of the eRFQ configured to identify at least one clearing house in combination with clearing house requirements of one or more resting orders allows clearing of appropriate matched legs; and sending, by the at least one computer processor using the implied spread determination module, a notification of the created implied spread to an electronic match engine for matching, the matching including executing all the multiple legs of the implied spread.

2. The method of claim 1, further comprising:
comparing, using the request for quote processor module, the financial instrument associated with the eRFQ to a search list, the search list comprising a plurality of financial instruments to be monitored for implied spreads; and
wherein the two determining steps result from the financial instrument associated with the eRFQ being in the search list.

3. The method of claim 2, where the comparing includes:
comparing the financial instrument associated with the eRFQ to a collection of needed orders which are generated based on requirements of acceptable trade templates.

4. The method of claim 3, where the two determining steps occur in parallel with and apart from an electronic match engine in the exchange computer system, the method further comprising:
updating the collection of needed orders based on the two determining steps occurring in parallel apart from the electronic match engine.

5. The method of claim 1, where the financial instrument associated with the eRFQ is a synthetic implied spread order comprising information to facilitate matching by the electronic match engine of the synthetic implied spread order with the one or more resting orders, the information comprising order book identifiers; where the determining includes verifying the information that facilitates matching of the synthetic implied spread order, including confirming status of orders in order books corresponding to the order book identifiers; and where the matching by the electronic match engine includes using the information of the implied spread order to facilitate matching.

6. The method of claim 1, the two determining steps occurring in at least one remote computer outside the exchange.

7. The method of claim 1, wherein the financial instrument associated with the eRFQ is one of: an outright order for a futures contract, a spread order for a futures contract, and an outright order for an options contract.

8. A computerized apparatus comprising:
a computer processor configured to execute computer-executable instructions; and
a computer memory storing a search list and the computer-executable instructions, which when executed by the computer processor, cause or enable the apparatus to:
receive an enhanced order, wherein the enhanced order includes an attribute configured to identify at least one clearing house, wherein the enhanced order includes a request to buy or sell a financial instrument;

determine, using an implied spread determination module, that a combination of the enhanced order with one or more resting orders for the financial instrument creates an implied spread, the implied spread comprising multiple legs, a first of the multiple legs corresponding to the financial instrument associated with the enhanced order and a second leg of the multiple legs corresponding to a resting order of the one or more resting orders;

determine, using the implied spread determination module, that the attribute of the enhanced order configured to identify at least one clearing house in combination with clearing house requirements of one or more resting orders allows clearing of appropriate matched legs; and send a notification of the created implied spread to an electronic match engine for matching, the matching including executing all the multiple legs of the implied spread.

9. The apparatus of claim 8, where the search list comprises a plurality of financial instruments to be monitored for implied spreads and is updated based on the determining occurring in the implied spread determination module that the combination of one or more resting orders creates an implied spread.

10. The apparatus of claim 8, where the search list is emptied to prevent determination of whether the financial instrument associated with the new enhanced order creates an implied order.

11. The apparatus of claim 8, where the financial instrument is one of a futures contract and an options contract.

12. A computer-assisted method comprising:
receiving an enhanced order at an electronic match engine, wherein the enhanced order includes an attribute configured to identify at least one clearing house, wherein the enhanced order includes a request to buy or sell a financial instrument;

determining, using an implied spread determination module, that a combination of the enhanced order with one or more resting orders for the financial instrument creates an implied spread, the implied spread comprising multiple legs, a first of the multiple legs corresponding to the financial instrument associated with the enhanced order and a second leg of the multiple legs corresponding to a resting order of the one or more resting orders;

determining, using the implied spread determination module, that the attribute of the enhanced order configured to identify at least one clearing house in combination with clearing house requirements of one or more resting orders allows clearing of appropriate matched legs; and sending, using the implied spread determination module, a notification of the created implied spread to the electronic match engine for matching, the matching including executing all the multiple legs of the implied spread.

13. The method of claim 12, further comprising:
comparing the financial instrument associated with the enhanced order to a search list, the search list comprising a plurality of financial instruments to be monitored for implied spreads; and
wherein the two determining steps result from the financial instrument associated with the enhanced order being in the search list.

14. The method of claim 13, where the comparing includes:
comparing the financial instrument associated with the enhanced order to a collection of needed orders which are generated based on requirements of acceptable trade templates.

15. The method of claim 12, where the two determining steps occur in parallel with and apart from an electronic match engine in the exchange computer system, the method further comprising:
   updating the collection of needed orders based on the two determining steps occurring in parallel apart from the electronic match engine.

16. The method of claim 12, where the financial instrument associated with the enhanced order is a synthetic implied spread order comprising information to facilitate matching by the electronic match engine of the synthetic implied spread order with the one or more resting orders, the information comprising order book identifiers; where the determining includes verifying the information that facilitates matching of the synthetic implied spread order, including confirming status of orders in order books corresponding to the order book identifiers; and where the matching by the electronic match engine includes using the information of the implied spread order to facilitate matching.

17. The method of claim 12, the two determining steps occurring in at least one remote computer outside the exchange.

18. The method of claim 12, wherein the financial instrument associated with the enhanced order is one of: an outright order for a futures contract, a spread order for a futures contract, and an outright order for an options contract.

19. A non-transitory computer-readable medium storing computer-executable instructions that when executed by a processor cause a computing device to perform steps comprising:
   receiving an enhanced request for quote (eRFQ) at a request for quote processor module, wherein the eRFQ includes an attribute configured to identify at least one clearing house, wherein the eRFQ includes an inquiry regarding the current market for a financial instrument associated with the eRFQ;
   determining, using an implied spread determination module, that the financial instrument associated with the eRFQ in combination with one or more resting orders creates an implied spread, the implied spread comprising multiple legs, a first of the multiple legs corresponding to the financial instrument associated with the eRFQ and a second leg of the multiple legs corresponding to a resting order of the one or more resting orders;
   determining, using the implied spread determination module, that the attribute of the eRFQ configured to identify at least one clearing house in combination with clearing house requirements of one or more resting orders allows clearing of appropriate matched legs; and
   sending, using the implied spread determination module, a notification of the created implied spread to an electronic match engine for matching, the matching including executing all the multiple legs of the implied spread.

20. The non-transitory computer-readable medium of claim 19 further storing computer-executable instructions that when executed by the processor cause the computing device to perform steps comprising:
   comparing, using the request for quote processor module, the financial instrument associated with the eRFQ to a search list, the search list comprising a plurality of financial instruments to be monitored for implied spreads; and
   wherein the two determining steps result from the financial instrument associated with the eRFQ being in the search list; and
   wherein the comparing includes comparing the financial instrument associated with the eRFQ to a collection of needed orders which are generated based on requirements of acceptable trade templates.

* * * * *